США010469359B2

United States Patent
Lee et al.

(10) Patent No.: US 10,469,359 B2
(45) Date of Patent: Nov. 5, 2019

(54) GLOBAL RESOURCE ORCHESTRATION SYSTEM FOR NETWORK FUNCTION VIRTUALIZATION

(71) Applicant: Futurewei Technologies, Inc., Plano, TX (US)

(72) Inventors: Young Lee, Plano, TX (US); Linda Dunbar, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 224 days.

(21) Appl. No.: 15/342,824

(22) Filed: Nov. 3, 2016

(65) Prior Publication Data

US 2018/0123943 A1  May 3, 2018

(51) Int. Cl.
| | |
|---|---|
| *H04L 12/755* | (2013.01) |
| *H04L 12/46* | (2006.01) |
| *H04L 12/707* | (2013.01) |
| *H04L 12/703* | (2013.01) |
| *H04L 12/725* | (2013.01) |
| *H04L 12/715* | (2013.01) |

(52) U.S. Cl.
CPC ........ *H04L 45/021* (2013.01); *H04L 12/4641* (2013.01); *H04L 45/22* (2013.01); *H04L 45/28* (2013.01); *H04L 45/306* (2013.01); *H04L 45/64* (2013.01)

(58) Field of Classification Search
CPC .................................................... H04L 41/082
See application file for complete search history.

(56) References Cited

U.S. PATENT DOCUMENTS

| | | | | |
|---|---|---|---|---|
| 9,560,078 | B2* | 1/2017 | Sood | H04L 63/20 |
| 9,832,674 | B2* | 11/2017 | Ghai | H04W 12/04 |
| 9,864,859 | B2* | 1/2018 | Sood | H04L 63/08 |
| 9,930,127 | B2* | 3/2018 | Qiu | H04L 67/16 |
| 10,075,827 | B1* | 9/2018 | Kodaypak | H04W 4/70 |
| 10,270,648 | B2* | 4/2019 | Chen | H04W 88/18 |
| 2014/0086253 | A1* | 3/2014 | Yong | H04L 12/4633 370/395.53 |
| 2014/0229945 | A1* | 8/2014 | Barkai | H04L 49/70 718/1 |
| 2014/0317293 | A1* | 10/2014 | Shatzkamer | G06F 9/455 709/226 |

(Continued)

OTHER PUBLICATIONS

Rekhter, Y., T. Li, and S. Hares. "RFC 4271." Internet Engineering Task Force, http://www.rfc-editor.org/rfc/rfc4271.txt, access on (Jun. 2014).*

(Continued)

*Primary Examiner* — Jimmy H Tran
(74) *Attorney, Agent, or Firm* — Conley Rose, P.C.

(57) ABSTRACT

A method implemented by a global resource orchestrator (GRO) includes receiving, multiple virtual network function (VNF) resource container (RC) table update messages comprising multiple VNF RC tables from multiple VNF forwarders, where each of the VNF RC tables comprises information about multiple VNF instances (VNFIs), receiving VNF RC connectivity matrix update messages from the VNF forwarders, where each of the VNF RC connectivity matrix update message indicates which of the VNF RCs that a VNF forwarder sending the VNF RC connectivity matrix update message is connected to.

20 Claims, 18 Drawing Sheets

(56) References Cited

U.S. PATENT DOCUMENTS

| | | | | |
|---|---|---|---|---|
| 2015/0234725 A1* | 8/2015 | Cillis | | G06F 11/263 |
| | | | | 714/33 |
| 2015/0237519 A1* | 8/2015 | Ghai | | H04W 24/10 |
| | | | | 380/270 |
| 2016/0212012 A1* | 7/2016 | Young | | H04L 41/14 |
| 2016/0226663 A1* | 8/2016 | Jones | | H04L 9/14 |
| 2016/0226913 A1* | 8/2016 | Sood | | H04L 63/20 |
| 2016/0248858 A1* | 8/2016 | Qiu | | H04L 67/16 |
| 2016/0248860 A1* | 8/2016 | Dunbar | | H04L 67/16 |
| 2016/0315802 A1* | 10/2016 | Wei | | H04L 41/06 |
| 2016/0328259 A1* | 11/2016 | Xia | | G06F 9/45558 |
| 2016/0337172 A1* | 11/2016 | Yu | | H04L 12/6418 |
| 2016/0337329 A1* | 11/2016 | Sood | | H04L 63/08 |
| 2016/0366014 A1* | 12/2016 | Koo | | H04L 12/4641 |
| 2016/0373474 A1* | 12/2016 | Sood | | H04L 63/1425 |
| 2017/0006083 A1* | 1/2017 | McDonnell | | H04L 67/06 |
| 2017/0052809 A1* | 2/2017 | Kano | | G06F 9/45558 |
| 2017/0063628 A1* | 3/2017 | Rasanen | | H04L 67/327 |
| 2017/0093721 A1* | 3/2017 | Kano | | H04L 47/122 |
| 2017/0150399 A1* | 5/2017 | Kedalagudde | | H04W 28/08 |
| 2017/0171102 A1* | 6/2017 | Parker | | H04L 67/02 |
| 2017/0214694 A1* | 7/2017 | Yan | | H04L 63/20 |
| 2017/0244596 A1* | 8/2017 | Chen | | H04W 88/18 |
| 2017/0272523 A1* | 9/2017 | Cillis | | H04L 41/082 |
| 2017/0293500 A1* | 10/2017 | Molina | | G06F 9/45558 |
| 2017/0318087 A1* | 11/2017 | Qiu | | H04L 41/082 |
| 2017/0318097 A1* | 11/2017 | Drew | | H04L 67/16 |
| 2017/0331671 A1* | 11/2017 | Olsson | | H04L 41/04 |
| 2017/0331884 A1* | 11/2017 | Colle | | H04L 41/0668 |
| 2017/0338968 A1* | 11/2017 | Feng | | H04L 29/06 |
| 2018/0026794 A1* | 1/2018 | Nakano | | G06F 21/33 |
| | | | | 713/176 |
| 2018/0041578 A1* | 2/2018 | Lee | | H04L 47/70 |
| 2018/0091420 A1* | 3/2018 | Drake | | H04L 12/5689 |
| 2018/0160387 A1* | 6/2018 | Chastain | | H04W 60/04 |
| 2018/0227182 A1* | 8/2018 | Patton | | H04L 41/0806 |
| 2018/0227837 A1* | 8/2018 | Starsinic | | H04W 4/70 |
| 2018/0270084 A1* | 9/2018 | P ZM NY | | H04L 61/103 |
| 2019/0109756 A1* | 4/2019 | Abu Lebdeh | | G06F 9/45558 |

OTHER PUBLICATIONS

Bates, T., et al. "RFC 4760: Multiprotocol Extensions for BGP-4." IETF, (Jan. 2007).*

Berger, L., R. White, and E. Rosen. BGP IPsec Tunnel Encapsulation Attribute. No. RFC 5566. 2009.*

* cited by examiner

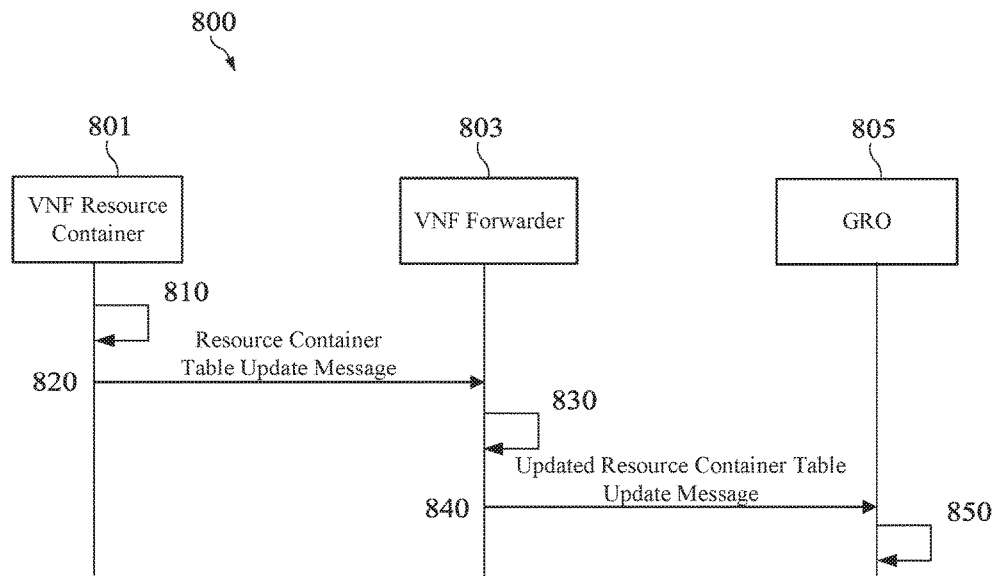
FIG. 8
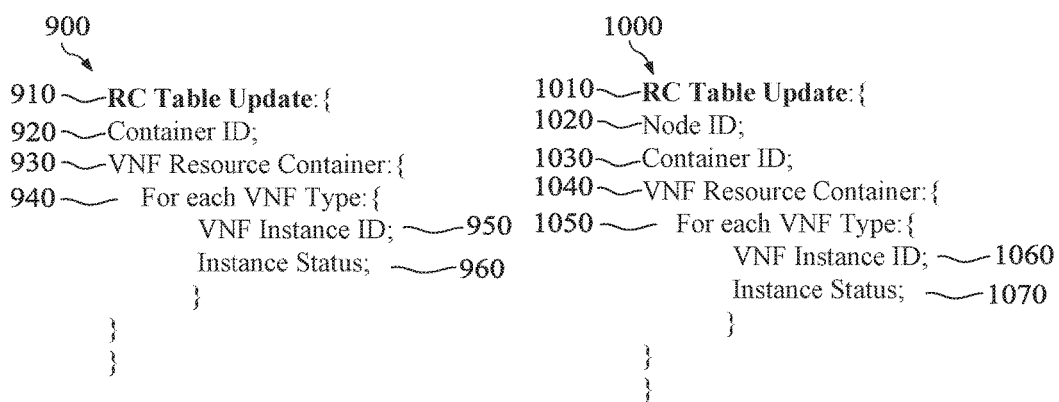
FIG. 9                    FIG. 10

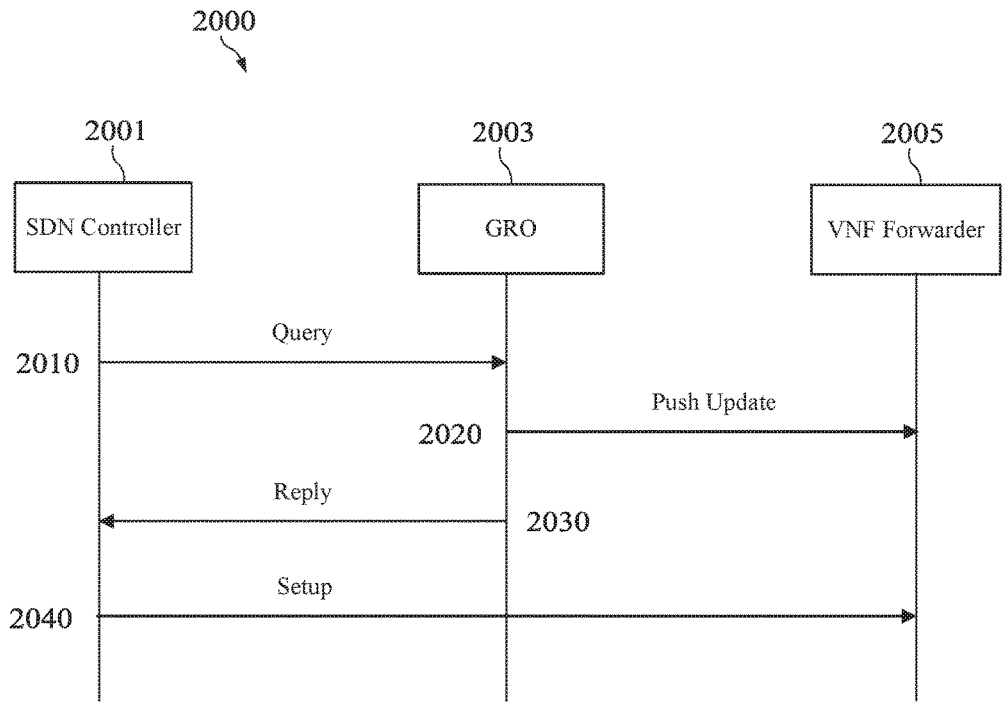

GLOBAL RESOURCE ORCHESTRATION SYSTEM FOR NETWORK FUNCTION VIRTUALIZATION

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service chaining refers to a service deployment model that applies a sequence of network services to a data flow in a specific order. A service chaining deployment model may insert Open Systems Interconnection (OSI) Layer 4 (L4) to Layer 7 (L7) services in data-forwarding paths between peers. Some examples of L4 to L7 services may include firewalls (FWs), wide area network (WAN) and application accelerations, load balancing (LB), and network address translations (NATs). The L4 to L7 services are commonly provided by dedicated hardware appliances located at a centralized location, for example, at a data center (DC) gateway. Thus, data-forwarding may direct all traffic to traverse through the DC gateway, which may cause a high volume of traffic at the DC gateway.

SUMMARY

One of the main problems in traditional methods of network function virtualization (NFV) occurs when a network element (NE) attempts to complete a virtual network function (VNF) chain request when one or more VNF instances (VNFIs) fails. The concepts disclosed herein solve this problem by forming a global resource orchestrator (GRO). The GRO system overcomes the foregoing problem by maintaining global information on all VNFIs and status information for each of the VNFIs such that the GRO system effectively and efficiently allocates a new VNFI from a VNF resource container when a particular VNFI fails.

In one example embodiment, the disclosure includes method implemented by a GRO, comprising receiving, by a receiver, a plurality of VNF resource container (RC) table update messages comprising a plurality of VNF RC tables from a plurality of VNF forwarders, wherein each of the VNF RC tables comprises information about a plurality of VNFIs, wherein each of the VNFIs is associated with VNFs executable at a plurality of VNF RCs, and wherein the information comprises VNF types of the VNFIs, identifiers for each of the VNFIs, and statuses of the VNFIs, receiving, by the receiver, a plurality of VNF RC connectivity matrix update messages from the VNF forwarders, wherein the VNF RC connectivity matrix update message indicates which of the VNF RCs that a VNF forwarder sending the VNF RC connectivity matrix update message is connected to, generating, by a processor coupled to the receiver, a node-VNF RC connectivity matrix based on the plurality of VNF RC connectivity matrix update messages, wherein the node-VNF RC connectivity matrix indicates which VNF RCs that each VNF forwarder has access to, and storing, by a memory coupled to the processor, the node-VNF RC connectivity matrix and the VNF RC tables. In some embodiments, the disclosure also includes wherein the plurality of VNF RC tables are generated by the plurality of VNF RCs, and wherein each VNF RC table comprises a corresponding Internet Protocol (IP) address of a VNF RC that generates the VNF RC table, and/or wherein the statuses of the VNFIs indicate an available status when the VNFIs are idle, and/or wherein the statuses of the VNFIs indicate an unavailable status when the VNFIs are already providing a service, and/or wherein the statuses of the VNFIs indicate an unavailable state when the VNFIs have failed, and/or wherein the statuses of the VNFIs indicate an available status when the VNFIs are idle, and wherein the method further comprises receiving, by the receiver, a query message from a software defined network (SDN) controller, wherein the SDN controller is configured to communicate with the VNF forwarders and the VNF RCs, wherein the query message comprises a VNF chain request and network resource conditions, wherein the VNF chain request comprises an ordered set of VNFs, and wherein the network resource conditions comprise network element connectivity data, calculating, by the processor, an optimal sequence of VNFIs using the node-VNF RC connectivity matrix and the VNF RC tables, transmitting, by a transmitter coupled to the processor, information about the optimal sequence of VNFIs to the VNF forwarders that are associated with the VNFIs in the optimal sequence of VNFIs, and storing, in the memory, the optimal sequence of VNFIs, and/or further comprising calculating, by the processor, a VNF chain path based on the optimal sequence of VNFIs, the node-VNF RC connectivity matrix, the VNF RC tables, and the network resource conditions, wherein the network resource conditions are provided by the SDN controller, transmitting, by the transmitter, the VNF chain path to the SDN controller, and storing, in the memory, the VNF chain path, and/or further comprising receiving, by the receiver, an updated RC table update message from one of the VNF forwarders, wherein the updated RC table update message comprises an indication that one of the VNFIs that is in the available status has become unavailable, updating, by the processor, the corresponding VNF RC table stored in the memory with a status change based on the updated RC table update message, updating, by the processor, the optimal sequence of VNFIs to use another VNFI that is in the available status when the one of VNFIs that became unavailable is indicated as a VNFI of the optimal sequence of VNFIs in the memory, re-calculating, by the processor, a new VNF chain path based on the updated optimal sequence of VNFIs, the node-VNF RC connectivity matrix, the VNF RC tables, and the network resource conditions, transmitting, by the transmitter, the re-calculated VNF chain path to the SDN controller, and storing, in the memory, the re-calculated VNF chain path, and/or wherein the VNF forwarders comprise virtual machines (VMs), and/or wherein the plurality of VNF resource containers are coupled to at least one VNF forwarder.

In another embodiment, the disclosure includes, an NE implemented as a GRO, comprising a receiver configured to receive a plurality of VNF RC table update messages comprising a plurality of VNF RC tables from a plurality of VNF forwarders, wherein each of the VNF RC tables comprises information about a plurality of VNFIs, wherein each of the VNFIs are associated with VNFs executable at a plurality of VNF RCs, and wherein the information comprises VNF types of the VNFIs, identifiers for each of the VNFIs, and statuses of the VNFIs, and receive a plurality of VNF RC connectivity matrix update messages from the VNF forwarders, wherein the VNF RC connectivity matrix update message indicates which of the VNF RC that a VNF forwarder sending the VNF RC connectivity matrix update message is connected to, a processor coupled to the receiver and configured to generate a node-VNF RC connectivity matrix based on the plurality of VNF RC connectivity matrix update messages, wherein the node-VNF RC connectivity matrix indicates which VNF RCs that each VNF forwarder has access to, and a memory coupled to the processor and configured to store the node-VNF RC connectivity matrix and the VNF resource container tables. In some embodiments, the disclosure also includes wherein the statuses of the VNFIs indicate an available status when the VNFIs are idle, and/or wherein the receiver is further configured to receive a query message from an SDN controller, wherein the SDN controller is configured to communicate with the VNF forwarders and the VNF RCs, wherein the query message comprises a VNF chain request and network resource conditions, wherein the VNF chain request comprises an ordered set of VNFs, wherein the network resource conditions comprise network element connectivity data, wherein the processor is further configured to calculate an optimal sequence of VNFIs using the node-VNF RC connectivity matrix and the VNF RC tables, wherein the NE further comprises a transmitter coupled to the processor and configured to transmit information about the optimal sequence of VNFIs to the VNF forwarders that are associated with the VNFIs in the optimal sequence of VNFIs, and wherein the memory is further configured to store the optimal sequence of VNFIs, and/or wherein the processor is further configured to calculate a VNF chain path based on the optimal sequence of VNFIs, the node-VNF resource container connectivity matrix, the VNF RC tables, and the network resource conditions, wherein the network resource conditions are provided by the SDN controller, wherein the transmitter is further configured to transmit the VNF chain path to the SDN controller, and wherein the memory is further configured to store the VNF chain path, and/or wherein receiver is further configured to receive an updated RC table update message from one of the VNF forwarders, wherein the updated RC table update message comprises an indication that one of the VNFIs that is in the available status has become unavailable, wherein the processor is further configured to update the corresponding VNF RC table stored in the memory with a status change based on the updated RC table update message, update the optimal sequence of VNFIs to use another VNFI that is in the available status when the one of VNFIs that became unavailable is indicated as a VNFI of the optimal sequence of VNFIs in the memory, and re-calculate a new VNF chain path based on the updated optimal sequence of VNFIs, the node-VNF RC connectivity matrix, the VNF RC tables, and the network resource conditions, wherein the transmitter is further configured to transmit the new VNF chain path to the SDN controller, and wherein the processor is further configured to store the new VNF chain path.

In another embodiment, the disclosure includes an NE implemented as an SDN controller, comprising a receiver configured to receive a VNF chain request from a client application, wherein the VNF chain request comprises an ordered set of VNFs, and obtain network resource conditions of a network associated with the SDN, a processor coupled to the receiver and configured to generate a query message, wherein the query message comprises the VNF chain request and the network resource conditions, and a transmitter coupled to the processor and configured to transmit the query message to a GRO. In some embodiments, the disclosure further includes wherein the receiver is further configured to receive a VNF chain path generated by the GRO, wherein the VNF chain path comprises a plurality of VNF forwarders, wherein the plurality of VNF forwarders are in communication with at least one VNF RC, wherein the processor is further configured to generate a plurality of setup messages, wherein the plurality of setup messages comprise explicit route object (ERO) information for the plurality of VNF forwarders in the VNF chain path, wherein the ERO information comprise next hop addresses, and wherein the transmitter is further configured to transmit the plurality of setup messages to the plurality of VNF forwarders in the VNF chain path, and/or wherein the at least one VNF RC comprises VMs controlled by the SDN controller and configured to generate a plurality of VNF RC tables and transmit the generated plurality of VNF RC tables to the plurality of VNF forwarders, and/or wherein the plurality of VNF forwarders comprise VMs controlled by the SDN controller and configured to receive a plurality of VNF RC tables transmitted by at least one VNF RC that is in communication with at least one of the VNF forwarders, and transmit the plurality of VNF RC tables to the GRO, and/or wherein at least one VNF RC is in communication with at least one of the VNF forwarders, and wherein the at least one VNF RC comprises a plurality of VNFIs that provide network services.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 is a protocol diagram of a VNF resource container table update method according to an embodiment of the disclosure.

FIG. 9 is a syntax diagram of a VNF resource container table update message according to an embodiment of the disclosure.

FIG. 10 is a syntax diagram of an updated VNF resource container table update message according to an embodiment of the disclosure.

FIG. 20 is a protocol diagram of a VNF-enabled packet forwarding method according to an embodiment of the disclosure.

FIG. 21 is a syntax diagram of a "query" message according to an embodiment of the disclosure.

FIG. 22 is a syntax diagram of a "push" message according to an embodiment of the disclosure.

FIG. 23 is a syntax diagram of a "reply" message according to an embodiment of the disclosure.

FIG. 24 is a syntax diagram of a "setup" message according to an embodiment of the disclosure.

DETAILED DESCRIPTION

Figure 1:
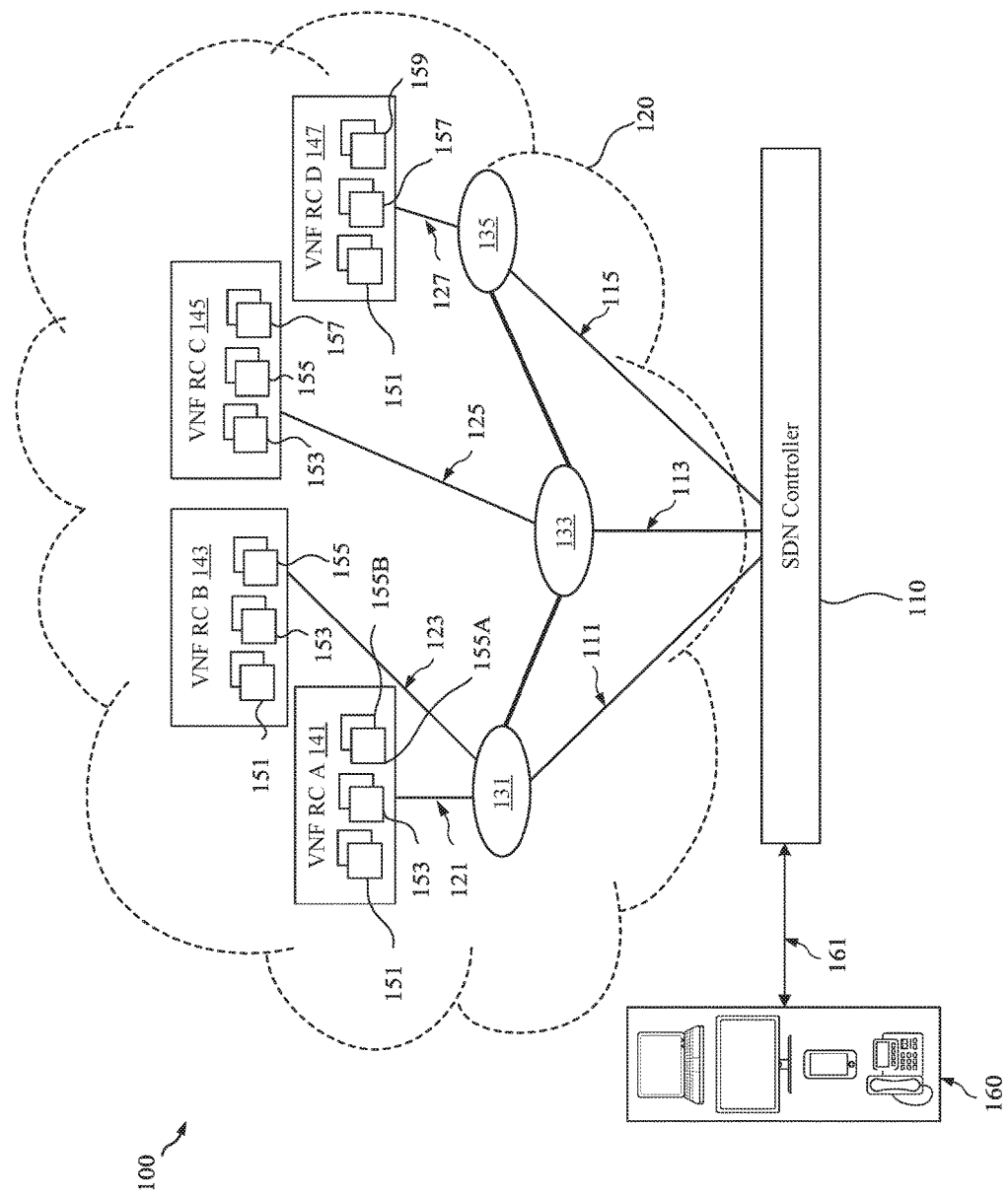
FIG. 1 a VNF chain network system according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

A VNF chaining deployment model may leverage recent development of NFV and software-defined networking (SDN) technologies. NFV enables the migration of network functions from dedicated hardware to software and/or VMs. SDN enables the separation of control and forwarding functions and a software programmable control plane. For example, network functions may be implemented as software components, moved out of the centralized location, and instantiated at multiple locations in the network by employing NFV. Data flows may be steered through the VNFI locations by employing the SDN model, where a SDN controller may configure network nodes with data-forwarding instructions.

A VNF chain defines an ordered set of abstract network functions that may be applied to packets and/or data frames. Some examples of network functions or network services may include FWs, NATs, LB, Transmission Control Protocol (TCP) accelerations, and other OSI L4 to L7 network services. A VNF chain path is an instantiation of a VNF chain. A VNF chain path traverses through a sequence of VNFIs in a network, where the VNFIs are instances of the network services in the VNF chain and the VNFIs are ordered according to the ordering constraints of the VNF chain. A VNF chain path may also be referred to as a network function path. The VNFIs may also be referred to as network function instances or Network Function Instance Components (NFICs). The VNFIs may be hosted by physical appliances and/or VMs, which may be referred to as VNF resource containers. The VNF resource containers may be distributed throughout a network. In addition, a particular type of VNFI (e.g., FW) may be instantiated at multiple locations in a network. For example, a VNF resource container located at one location of the network may host two FW VNFIs (e.g., FW-instance 1 and FW-instance 2) and two TCP acceleration VNFIs (e.g., TCP-instance 1 and TCP-instance 2). A physical appliance located at another location may host a LB VNFI (e.g., LB-instance 1), two NAT VNFIs (e.g., NAT-instance 1 and NAT-instance 2), and another FW VNFI (e.g., FW-instance 3).

As an example, a first VNF chain, denoted as VNFC1, may be composed from an ordered set of VNFIs, denoted as {v1, v4, v6}, and a second VNF chain, denoted as VNFC2, may be composed from another ordered set of VNFIs, denoted as {v4, v7}, where v1 may be an FW VNFI, v4 may be a NAT VNFI, v6 may be an LB VNFI, and v7 may be a TCP acceleration VNFI. Thus, in order to service the first VNF chain, VNFC1, a first VNF chain path is selected to traverse through an FW VNFI, followed by a NAT VNFI and an LB VNFI. Similarly, in order to service the second VNF chain, VNFC2, a second VNF chain path is selected to traverse through a NAT VNFI, followed by a TCP acceleration VNFI. The VNFIs are hosted on the VNF resource containers (e.g., physical appliances or VMs), thus traffic is steered through the VNF resource containers. However, VNF resource containers are end devices, which may be non-data-forwarding devices. Thus, VNF resource containers are attached to data-forwarding network elements such that data traffic may be directed to and from the VNF resource containers. The data-forwarding network elements that are attached to the VNF resource containers are referred to as VNF forwarders. Switches or routers are an example of VNF forwarders. Therefore, the computation or establishment of VNF chain paths requires knowledge of the VNF resource containers and the VNF forwarders that may reach (e.g., forward data to and from) the VNF resource containers. In addition, in an NFV environment, there may be a very large number of VNFIs for each VNF type and a high chance of status change for VNFIs due to VNFIs being used, VNF resource containers being deleted, moved, or new VNF resource containers being instantiated. Thus, the statuses of the VNFIs and/or attached VNF forwarders may change dynamically. In order to complete the VNF chain path and steer a data flow through a specific sequence of network services, a global perspective of changes in VNFIs and VNF forwarders is needed.

FIG. 1 is an embodiment of a VNF chain network system 100. The system 100 comprises a client 160, an SDN controller 110, and a network 120. The network 120 comprises a plurality of VNF forwarders 131, 133, and 135, and a plurality of VNF resource containers 141, 143, 145, and 147 (designated as VNF RC A, VNF RC B, VNF RC C, and VNF RC D, respectively). The network 120 may further comprise other network nodes that are unaware of VNF chains and may not provide network services.

The network 120 is a service overlay network. The underlying physical network of the network 120 may comprise an electrical network, an optical network, and/or any types of physical network suitable for transporting data. The network 120 may comprise one or more network domains. The network 120 may employ any transport protocols, such as an IP/User Datagram Protocol (UDP), suitable for transporting data over the underlying physical network. The network 120 may employ any type of network virtualization and/or network overlay technologies, such as a virtual extensible local area network (VXLAN). In an embodiment, the network 120 is an SDN-enabled network, where network control is decoupled from data-forwarding and the data plane is programmable by a control plane entity, such as the SDN controller 110, as discussed more fully below.

The VNF resource containers 141, 143, 145, and 147 may be physical hardware appliances, servers, VMs, or any other network devices configured to host and/or provide one or more VNFIs 151, 153, 155A-B, 157, and 159. The VNF resource containers 141, 143, 145, and 147 may be located at various locations throughout the network 120. The VNFIs 151, 153, 155A-B, 157, and 159 may be any type of network services or functions, such as FW, NAT, and LB. For example, one or more of the VNFIs 151 may be FW VNFIs, one or more of the VNFIs 153 may be TCP acceleration VNFIs, one or more of the VNFIs 155 may be NAT VNFIs, and one or more of the VNFIs 157 and 159 may be LB VNFIs. Some VNFIs 151, 153, 155A-B, 157, and 159 of the same type may support the same capabilities and/or policies, while other VNFIs 151, 153, 155A-B, 157, and 159 of the same type may support different capabilities and/or policies. For example, one NAT VNFI 155A supports a policy A and a data throughput of about 10 gigabits per second (Gbps) and another NAT VNFI 155B supports a policy B and a data throughput of about 100 Gbps. For example, both the NAT VNFIs 155A and 155B may support the policy A and the data throughput of about 10 Gbps. In some embodiments, the VNFIs 151, 153, 155A-B, 157, and 159 and/or the VNF resource containers 141, 143, 145, and 147 are provided by different vendors. For example, one vendor provides VNFI 157 at one area of the network 120 and another vendor provides VNFI 159 at another area of the network 120. The VNF resource containers 141, 143, 145, and 147 may be identified by an IP addresses irrespective of whether the VNF resource containers 141, 143, 145, and 147 are physical appliances or VMs. In some embodiments, a vendor may configure all its VNF resource containers 141, 143, 145, and 147 in a same subnet. In such embodiments, all VNF resource containers 141, 143, 145, and 147 of a particular vendor may comprise IP addresses of 10.1.1.X.

The VNF forwarders 131, 133, 135 may be routers, switches, or any other network elements configured to forward data to one or more VNFIs 151, 153, 155A-B, 157, and 159. A VNF forwarder 131, 133, 135 may be a VM or a physical device coupled to one or more VNF resource containers 141, 143, 145, and 147. In some embodiments, the VNF forwarders 131, 133, and 135 may be OPENFLOW (OF) switches. The VNF forwarders 131, 133, and 135 are coupled to one or more VNF resource containers 141, 143, 145, and 147 using a plurality of links 121, 123, 125, and 127 and logically attached to the VNFIs 151, 153, 155A-B, 157, and 159 hosted by the VNF resource containers 141, 143, 145, and 147. The links 121, 123, 125, and 127 may comprise physical links such as fiber optic links, electrical links, wireless links, and logical links that used to transport data in the network 120. In FIG. 1, according to an embodiment, the VNF forwarder 131 is coupled to the VNF resource container VNF RC A 141 using the link 121 and the VNF resource container VNF RC B 143 using the link 123. Therefore, the VNF forwarder 131 is also logically attached to the VNFIs 151, 153, and 155A-B hosted by the VNF resource container VNF RC A 141 and the VNF resource container VNF RC B 143. The VNF forwarder 133 is coupled to the VNF resource container VNF RC C 145 using the link 125 and logically attached to the VNFIs 153, 155, and 157 hosted by the VNF resource container VNF RC C 145. Finally, the VNF forwarder 135 is coupled to the VNF resource container VNF RC D 147 using the link 127 and logically attached to the VNFIs 151, 157 and 159 hosted by the VNF resource container VNF RC D 147.

In some embodiments, the VNF forwarders 131, 133, and 135 may discover the VNF resource containers 141, 143, 145, and 147 by employing an address resolution protocol (ARP) for IP version 4 (IPv4) addresses and/or a neighbor discovery protocol (NDP) for IP version 6 (IPv6) addresses. The VNF forwarders 131, 133, and 135 may receive forwarding instructions and/or traffic steering policies from the SDN controller 110 using a plurality of links 111, 113, and 115 to facilitate traffic steering. The links 111, 113, and 115 may comprise physical links such as fiber optic links, electrical links, wireless links, and logical links that used to transport data to the network 120. In FIG. 1, according to an embodiment, the VNF forwarder 131 may be instructed using the link 111 to steer traffic through one or more VNFIs 151, 153, and 155A-B located at one or more VNF resource containers 141 and 143. In another embodiment, the VNF forwarder 133 may be instructed using the link 113 to steer traffic through one or more VNFIs 153, 155, and 157 located at the VNF resource container 145. In another embodiment, the VNF forwarder 135 may be instructed using the link 115 to steer traffic through one or more VNFIs 151, 157, and 159 located at the VNF resource container 147. It should be noted that some VNF forwarders 131, 133, and 135 may comprise VMs acting as VNF resource containers 141, 143, 145, and 147 hosting VNFIs 151, 153, 155A-B, 157, and 159. The VNF forwarders 131, 133, and 135 may route traffic to the VNF resource containers 141, 143, 145, and 147 according the VNF resource container 141, 143, 145, and 147 addresses via hypervisors executed on the VNF forwarders 131, 133, and 135.

The client 160 in the system 100 may be a laptop computer, a tablet computer, a smart phone, a smart television, and a code division multiple access (CDMA) phone configured to request a VNF chain request indicating a sequence of network services or functions (e.g., FW, LB, or NAT) for a data flow. The client 160 is coupled to the SDN controller 110 using a link 161, and the client 160 may request the VNF chain request from the SDN controller 110, and receive a response message indicating that the network is ready to perform VNF services from the SDN controller 110 using the link 161. The link 161 may comprise a physical link such as a fiber optic link, an electrical link, a wireless link, and a logical link that used to transport data to the SDN controller 110.

The SDN controller 110 may be one or more VMs, a system, a distributed system, or any other device and/or system comprising a plurality of computing devices configured to manage the network 120, and setup VNF chain path. The SDN controller 110 provides an interface for a client 160 to specify VNF chain requirements and coordinates with the network 120 and to set up VNF chain paths for forwarding the client's 160 traffic in the network 120. For example, a client 160 may send a VNF chain request indicating a sequence of network services or functions for a data flow. Upon receiving the VNF chain request, the SDN controller 110 assigns the VNFIs in the network 120. For example, the SDN controller 110 may assigns VNFIs 151, 153, 155A-B, 157, and 159 of the network services in the network 120. Based on the assigned VNFIs 151, 153, 155A-B, 157, and 159 and the VNF resource container addresses corresponding to the assigned VNFIs 151, 153, 155A-B, 157, and 159, the SDN controller 110 constructs a VNF chain path.

To select a VNF chain path, the SDN controller 110 may employ a path computation element (PCE) to compute a shortest path through the network 120 traversing a subset of the available VNFIs 151, 153, 155A-B, 157, and 159. The subset of the available VNFIs 151, 153, 155A-B, 157, and 159 correspond to the requested network services via VNF forwarders 131, 133, and 135 associated with or logically attached to the VNFIs 151, 153, 155A-B, 157, and 159. Based on the selected VNF chain path, the SDN controller 110 determines traffic steering rules (e.g., forwarding rules and/or classification rules) for the VNF chain path and pushes the traffic steering rules to the VNF forwarders 131, 133, and 135. In some embodiments, the network 120 may be managed by multiple SDN controllers 110 operating in parallel. For example, each vendor may employ an SDN controller 110 to manage a group of VNF resource containers 141, 143, 145, and 147 and/or a group of VNF forwarders 131, 133, and 135 owned by the vendor. It should be noted that the system 100 may be configured as shown or alternatively configured as determined by a person of ordinary skill in the art to achieve the same functionalities.

In an embodiment, after determining the VNF chain path, the SDN controller 110 sends a response message to the client 160 using the link 161 to indicate that the network 120 is ready to provide network services or functions to the client's 160 traffic. However, a particular VNFIs 151, 153, 155A-B, 157, and 159 that is selected to provide the service for the client 160 may become unavailable due to network events such as the links 121, 123, 125, and 127 failure, reconfiguration of the VNFIs 151, 153, 155A-B, 157, and 159, and/or deletion of the VNF resource containers 141, 143, 145, and 147. In such embodiment, completion of the VNF chain path may be halted due to an absence of a dynamic update mechanism that monitors and updates the unavailable VNFIs 151, 153, 155A-B, 157, and 159. For example, the SDN controller 110 may choose and assign a first VNFI 151 in the VNF resource container 141 according to a VNF chain request made by the client 160, and send a response message to the client 160 indicating that the network 120 is ready to provide service for client's 160 traffic. After the client 160 receives the response message sent by the SDN controller 110, the client 160 sends the traffic to the network 120, and in particular to the SDN controller 110. The SDN controller 110 then forwards the traffic to the VNF forwarder 131 to send the traffic to VNF resource container 141. However, a network event may cause one of the VNFIs 151, 153, 155A-B, and 159 to fail. For example, the first VNFI 151 in the VNF resource container 141 may become unavailable due to a reconfiguration of the first VNFI 151. Therefore, the VNF forwarder 131 may have to hold the traffic of the client 160, and thus, the VNF chain request of the client 160 will not be completed effectively. The main reason that the VNF forwarder 131 has to hold the traffic is because currently there is no mechanism in the system 100 by which traffic may be assigned to another available VNFI 151 within the VNF resource container 141, or outside the VNF resource container 141 (i.e., VNF resource containers 143, 145, and 147). Further, the system 100 does not obtain or store data regarding the statuses of VNFIs 151, 153, 155A-B, 157, and 159.

In order to solve this problem, various embodiments disclosed herein are directed to forming a GRO in the system 100 that overcomes the foregoing problem by maintaining global information on all VNFIs 151, 153, 155A-B, 157, and 159 and status information for each of the VNFIs 151, 153, 155A-B, 157, and 159. In this way, the GRO effectively and efficiently allocates a new VNFI 151, 153, 155A-B, 157, and 159 from any VNF resource container 141, 143, 145, and 147 when a particular VNFI 151, 153, 155A-B, 157, and 159 fails. For example, the VNFIs 151, 153, 155A-B, 157, and 159 may be instantiated at any location in the network 120 and may be relocated, added, and/or deleted as resource constraints change. The disclosed embodiments provide the GRO with mechanisms for locating the VNFIs 151, 153, 155A-B, 157, and 159, corresponding VNF resource containers 141, 143, 145, and 147, and attached VNF forwarders 131, 133, and 137 dynamically. Therefore, the GRO is able to calculate VNF chain paths dynamically for steering traffic flows through VNFIs 151, 153, 155A-B, 157, and 159 as required by the VNF chain requests. For example, a client 160 may request a sequence of network services. The SDN controller 110 queries the GRO with respect to the available network resources to locate the VNFIs 151, 153, 155A-B, 157, and 159 as required by the VNF chain request of the client 160. The GRO is configured to calculate a sequence of VNFIs and a VNF chain path (e.g., a forwarding path) for the traffic of the client 160. The GRO calculates the VNF chain path for the client 160 by selecting VNFIs 151, 153, 155A-B, 157, and 159 and corresponding VNF forwarders 131, 133, and 135 in a load balancing manner. Upon calculating the VNF chain path, and the traffic steering rules the GRO transmits the VNF chain path to the SDN controller 110 and details of the selected VNFIs 151, 153, 155A-B, 157, and 159 to the VNF forwarders 131, 133, and 135. The disclosed embodiments enable VNF chain path constructions via dynamic VNFI attachment detections, and hence VNF chain request of the client 160 can be fulfill effectively and efficiently.

Figure 2:
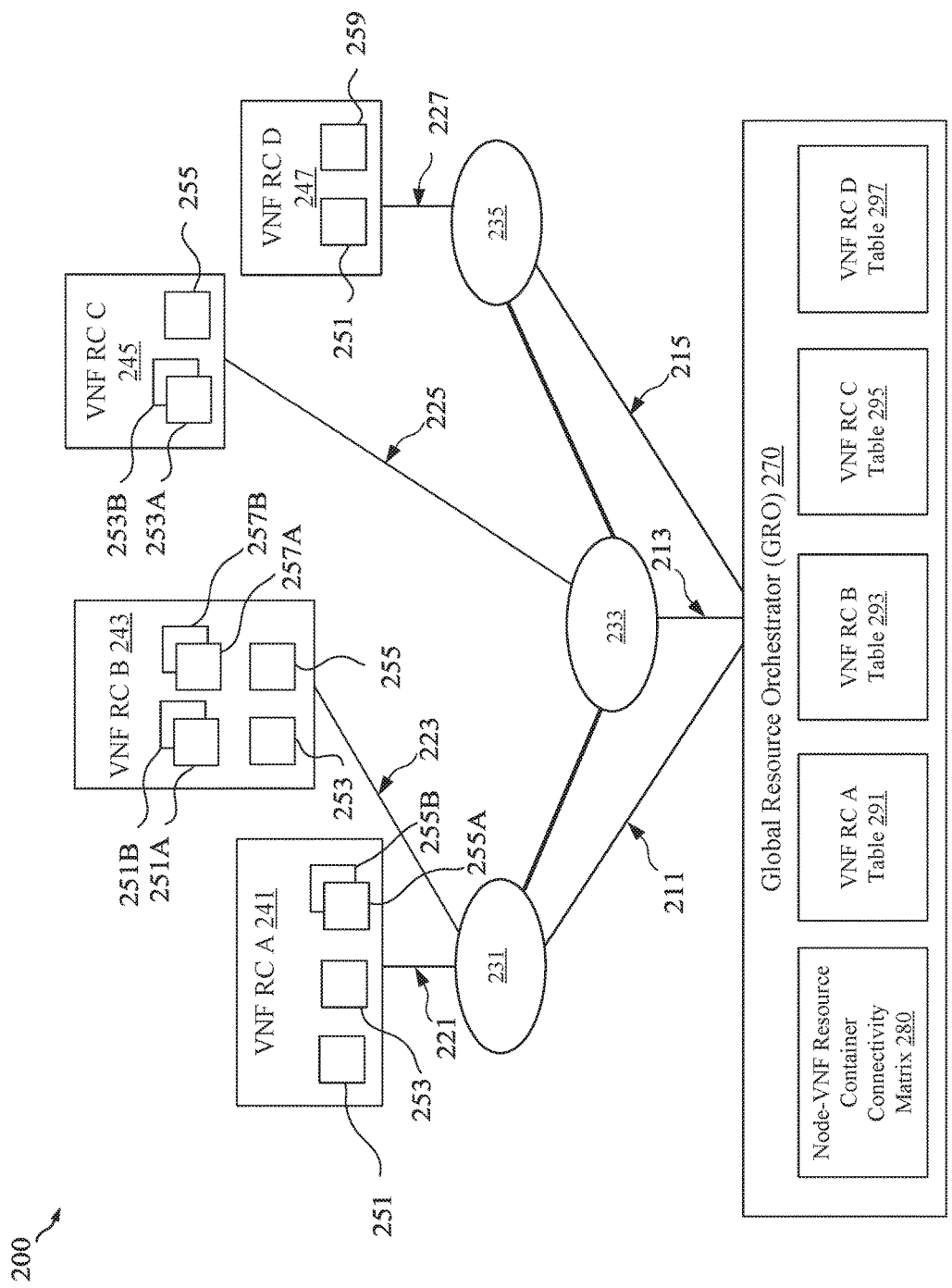
FIG. 2 is a schematic diagram of another VNF chain network system according to an embodiment of the disclosure.

FIG. 2 is a schematic diagram of a VNF chain network system 200 according to an embodiment of the disclosure. The VNF chain network system 200 of FIG. 2 is similar to the VNF chain network system 100 of FIG. 1, except that the VNF chain network system 200 includes a GRO 270 configured to monitor and update the statuses of VNFIs 251A-B, 253A-B, 255A-B, 257A-B, and 259. As shown, the system 200 comprises the GRO 270, a plurality of VNF forwarders 231, 233, and 235, and a plurality of VNF resource containers 241, 243, 245, and 247 (e.g., VNF RC A, VNF RC B, VNF RC C, and VNF RC D). The plurality of VNF forwarders 231, 233, and 235, and the plurality of VNF resource containers 241, 243, 245, and 247 are similar to the plurality of VNF forwarders 131, 133, and 135, and the plurality of VNF resource containers 141, 143, 145, and 147, respectively.

The VNF resource containers 241, 243, 245, and 247 are configured to host and/or provide one or more VNFIs 251A-B, 253A-B, 255A-B, 257A-B, and 259. The one or more VNFIs 251A-B, 253A-B, 255A-B, 257A-B, and 259 are similar to the one or more VNFIs 151, 153, 155A-B, 157, and 159. Further, the VNF forwarders 231, 233, and 235 coupled to one or more VNF resource containers 241, 243, 245, and 247 using a plurality of links 221, 223, 225, and 227 and logically attached to the VNFIs 251A-B, 253A-B, 255A-B, 257A-B, and 259 hosted by the VNF resource containers 241, 243, 245, and 247. The links 221, 223, 225, and 227 are similar to the links 121, 123, 125, and 127. The VNF forwarders 231, 233, and 235 are coupled to the GRO 270 using a plurality of links 211, 213, and 215. The links 211, 213, and 215 may comprise physical links such as fiber optic links, electrical links, wireless links, and logical links that used to transport data to and from the GRO 270.

The GRO 270 may be implemented in the SDN controller or may be implemented external to the SDN controller. The GRO 270 may be one or more VMs, a system, a distributed system, or any other device and/or system comprising a plurality of computing devices that configured to collect and transmit data. For example, the data stored at the GRO comprises current locations of the VNF resource containers 241, 243, 245, and 247, types of VNFIs 251A-B, 253A-B, 255A-B, 257A-B, and 259 hosted by the VNF resource containers 241, 243, 245, and 247, and the statuses of VNFIs 251A-B, 253A-B, 255A-B, 257A-B, and 259 (i.e., available (idle) or unavailable (taken or failed)). The GRO 270 is further configured to dynamically calculate optimal sequence of the VNFIs 251A-B, 253A-B, 255A-B, 257A-B, and 259 to provide services for the VNF chain request of the client, and re-calculate the optimal sequence of the VNFIs 251A-B, 253A-B, 255A-B, 257A-B, and 259 when a particular VNFI fails. The GRO 270 is further configured to incorporate the network resource factors of the network available in the SDN controller when calculating the optimal sequence for the VNF chain request. For example, the network resource factors may include the connectivity details of the network elements, VNF chain requirements, and other information regarding the network elements and/or the VNF chain.

The GRO 270 acts as a VNF chain administrative entity over a VNF chain domain operating in the network. The GRO 270 provides an interface for a client to specify VNF chain requirements and coordinates with the SDN controller to set up VNF chain paths for forwarding the client's traffic in the network. For example, a client may send a VNF chain request indicating a sequence of network services for a data flow to the SDN controller. Upon receiving the VNF chain request, the SDN controller queries the GRO 270 to calculate the optimal sequence of VNFIs 251A-B, 253A-B, 255A-B, 257A-B, and 259 for the requested VNF chain. The GRO 270 identifies the VNFI information of the network services required, assigns available VNFIs 251A-B, 253A-B, 255A-B, 257A-B, and 259 to create the optimal sequence of VNFIs 251A-B, 253A-B, 255A-B, 257A-B, and 259, and calculates the VNF chain path with respect to the available network resources. In an embodiment, the GRO 270 stores information of the VNFIs 251A-B, 253A-B, 255A-B, 257A-B, and 259 in a form of a matrix and tables. As shown in FIG. 2, the GRO 270 is configured to create a node-VNF resource container connectivity matrix 280 according to the connectivity data sent by the VNF forwarders 231, 233, and 235, and store a plurality of VNF resource container tables 291, 293, 295, and 297 (i.e., VNF RC A Table 291, VNF RC B Table 293, VNF RC C Table 295, and VNF RC D Table 297). Details about the node-VNF resource container connectivity matrix 280 and the plurality of VNF resource container tables 291, 293, 295, and 297 will be discussed more fully below. The VNFI information may include VNFI types, and VNFI statuses. The GRO 270 updates the VNFI information (i.e., the node-VNF resource container connectivity matrix 280 and the plurality of VNF resource container tables 291, 293, 295, and 297) dynamically. Therefore, in a situation where an assigned VNFI, such as the VNFIs 251A-B, 253A-B, 255A-B, 257A-B, and 259 becomes unavailable, the GRO 270 re-calculates the optimal sequence of VNFIs 251A-B, 253A-B, 255A-B, 257A-B, and 259 using the VNFI information to provide efficient and effective service to VNF chain by replacing the unavailable VNFI.

To calculate the optimal sequence of VNFIs 251A-B, 253A-B, 255A-B, 257A-B, and 259 for the VNF chain, the GRO 270 may employ a PCE to compute a shortest path through the network traversing a subset of the available VNFIs 251A-B, 253A-B, 255A-B, 257A-B, and 259 corresponding to the requested network services. Based on the calculated optimal sequence of VNFIs 251A-B, 253A-B, 255A-B, 257A-B, and 259 for the VNF chain, the GRO 270 calculates the VNF chain path and transmits the VNF chain path to the SDN controller. The GRO 270 further pushes the details about the selected VNFIs 251A-B, 253A-B, 255A-B, 257A-B, and 259 to the VNF forwarders 231, 233, and 235. In some embodiments, the network may be managed by multiple SDN controllers operating in parallel. For example, each vendor may employ an SDN controller to manage a group of VNF resource containers 241, 243, 245, and 247 and/or a group of VNF forwarders 231, 233, and 235 owned by the vendor. In such situation, the GRO 270 provides services to all the SDN controllers by implementing a one to many connection mechanisms between the GRO 270 and the SDN controllers.

Figure 3:
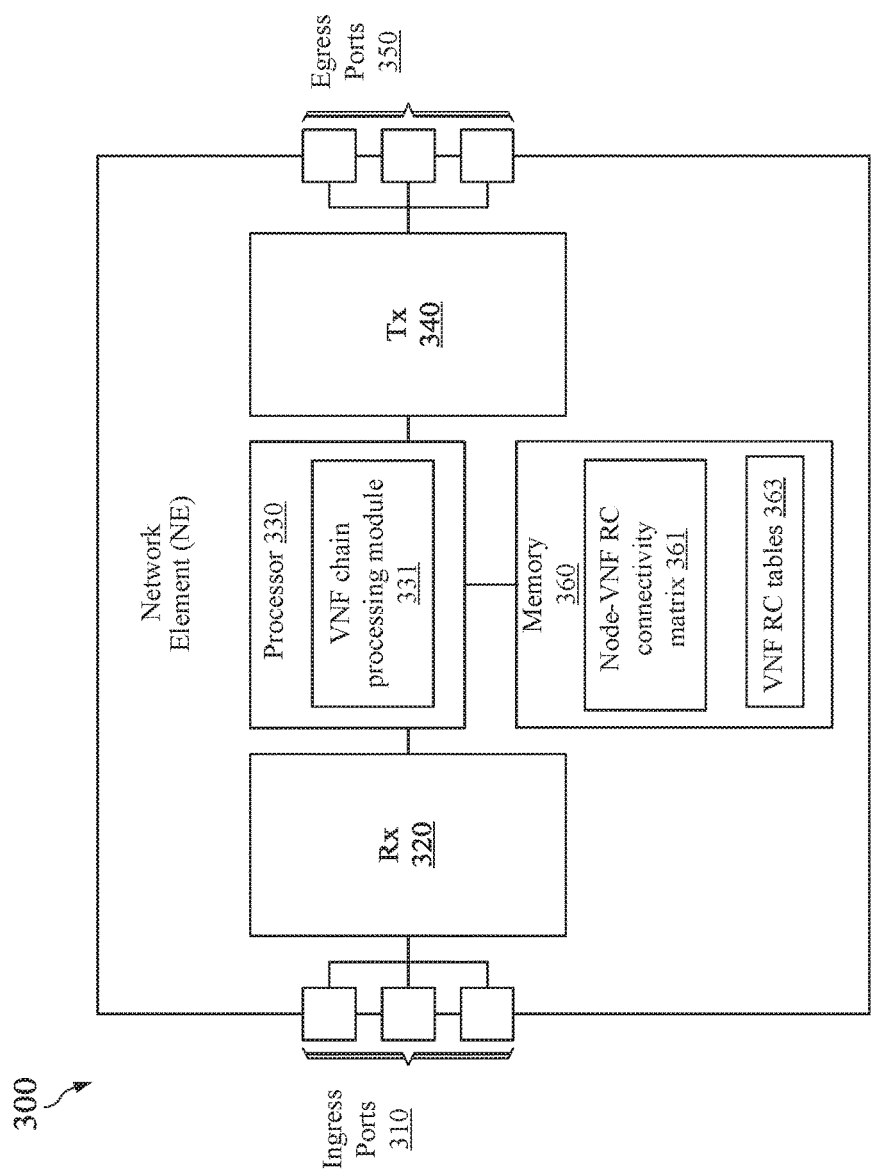
FIG. 3 is a schematic diagram of a network element (NE) in a VNF chain network system according to an embodiment of the disclosure.

FIG. 3 is a schematic diagram of an embodiment of NE in a VNF chain network system, such as the systems 100 and 200. For instance, the NE 300 may be a GRO, such as the GRO 270, an SDN controller, such as the SDN controller 110, a VNF resource container, such as the VNF resource containers 141, 143, 145, 147, 241, 243, 245, and 247, or a VNF forwarder, such as the VNF forwarders 131, 133, 135, 231, 233, and 235. The NE 300 may be configured to implement and/or support the dynamic VNF chain path calculation mechanisms described herein. The NE 300 may be implemented in a single node or the functionality of NE 300 may be implemented in a plurality of nodes. One skilled in the art will recognize that the term NE encompasses a broad range of devices of which NE 300 is merely an example. The NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 300. For instance, the features and/or methods in the disclosure may be implemented using hardware, firmware, and/or software installed to run on hardware. As shown in FIG. 3, the NE 300 comprises one or more ingress ports 310 and a receiver unit (Rx) 320 for receiving data, at least one processor, logic unit, or central processing unit (CPU) 330 to process the data, a transmitter unit (Tx) 340 and one or more egress ports 350 for transmitting the data, and a memory 360 for storing the data.

The processor 330 may comprise one or more multi-core processors and coupled to a memory 340, which may function as data stores, buffers, etc. The processor 330 may be implemented as a general processor or may be part of one or more application specific integrated circuits (ASICs) and/or digital signal processors (DSPs). The processor 330 may comprises a VNF chain processing module 331, which may perform processing functions of a GRO, such as the GRO 270, an SDN controller, such as the SDN controller 110, or a VNF forwarder, such as the VNF forwarders 231, 233, and 235 and implement methods 500, 800, 2000, and 2500, as discussed more fully below, and/or any other method discussed herein. As such, the inclusion of the VNF chain processing module 331 and associated methods and systems provide improvements to the functionality of the NE 300. Further, the VNF chain processing module 331 effects a transformation of a particular article (e.g., the network) to a different state. In an alternative embodiment, the VNF chain processing module 331 may be implemented as instructions stored in the memory 360, which may be executed by the processor 330. The memory 360 may comprise a cache for temporarily storing content, e.g., a random-access memory (RAM). Additionally, the memory 360 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 360 may be configured to store VNFI information, such as the VNFI types, the VNFI statuses, VNF resource container IP addresses, and/or traffic steering policies. In an embodiment, the memory 360 may comprise a node-VNF RC connectivity matrix 361, and VNF RC tables 363. The node node-VNF RC connectivity matrix 361 is configured to implement the functionalities of the node-VNF resource container connectivity matrix 280. Further, the VNF RC tables 363 is configured to implement the functionalities of the plurality of VNF resource container tables 291, 293, 295, and 297. The details of the functionalities of the node-VNF resource container connectivity matrix 280 and the plurality of VNF resource container tables 291, 293, 295, and 297 will be discussed more fully below.

It is understood that by programming and/or loading executable instructions onto the NE 300, at least one of the processor 330 and/or memory 360 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
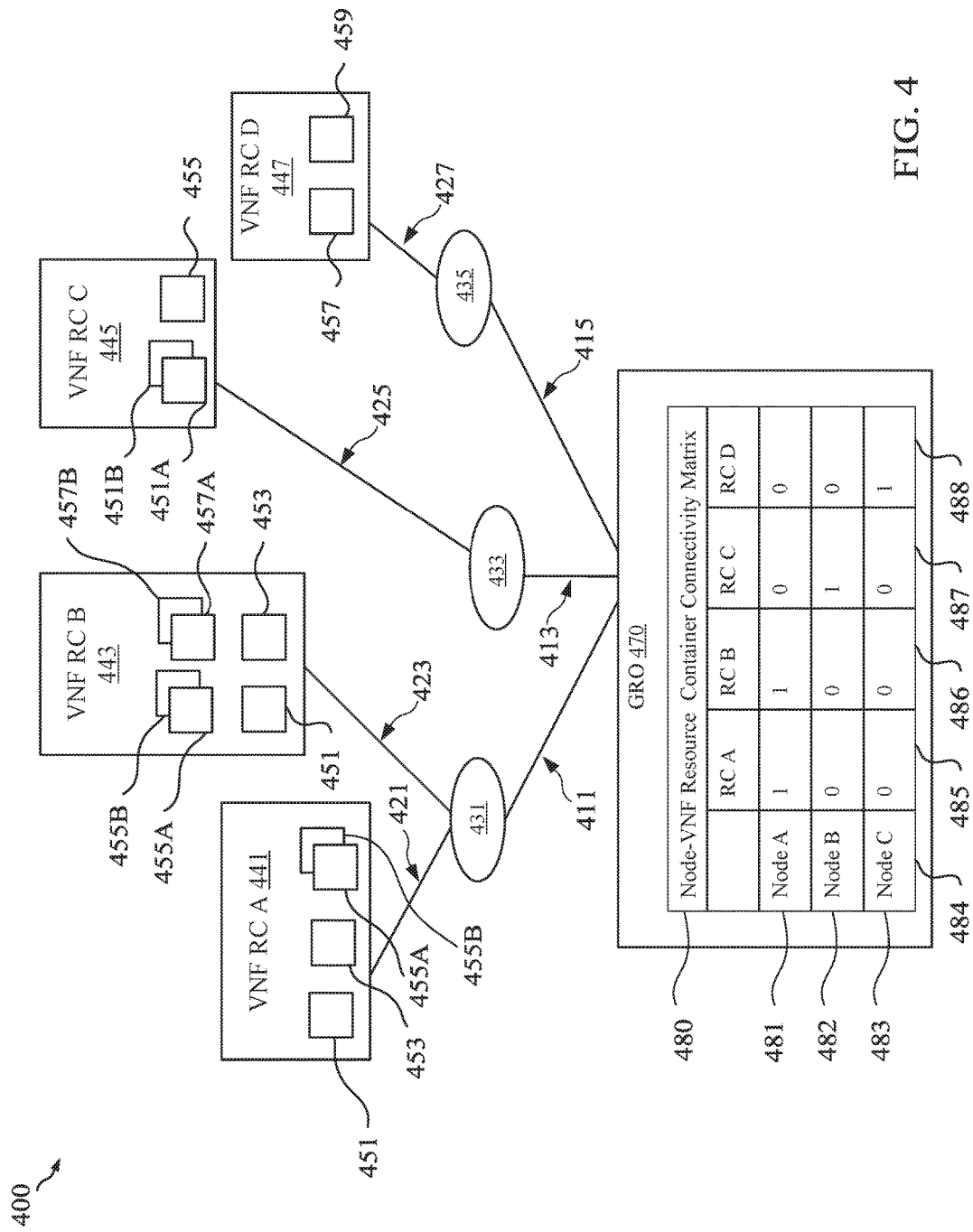
FIG. 4 is a diagram of a node-VNF resource container connectivity matrix generation by a VNF chain network system according to an embodiment of the disclosure.

FIG. 4 is a diagram of an embodiment of a node-VNF resource container connectivity matrix generation by a VNF chain network system 400. The system 400 is similar to the system 200. As shown in FIG. 4, the system 400 comprises a GRO 470, a plurality of VNF forwards 431, 433, and 435, and a plurality of VNF resource containers 441, 443, and 445 (e.g., VNF RC A, VNF RC B, VNF RC C, and VNF RC D). The GRO 470 is similar to the GRO 270. The plurality of VNF forwarders 431, 433, and 435, and the plurality of VNF resource containers 441, 443, 445, and 447 are similar to the plurality of VNF forwarders 231, 233 and 235, and the plurality of VNF resource containers 241, 243, 245, and 247, respectively.

The VNF resource containers 441, 443, 445, and 447 are configured to host and/or provide one or more VNFIs 451A-B, 453, 455A-B, 457A-B, and 459. The one or more VNFIs 451A-B, 453, 455A-B, 457A-B, and 459 are similar to VNFIs 251A-B, 253A-B, 255A-B, 257A-B, and 259. Further, the VNF forwarders 431, 433, and 435 are coupled to one or more VNF resource containers 441, 443, 445, and 447 using a plurality of links 421, 423, 425, and 427. The VNF forwarders 431, 433, and 435 are logically attached to the VNFIs 451A-B, 453, 455A-B, 457A-B, and 459 hosted by the VNF resource containers 441, 443, 445, and 447. The plurality of links 421, 423, 425, and 427 are similar to the plurality of links 221, 223, 225, and 227. The VNF forwarders 431, 433, and 435 are coupled to the GRO 470 using a plurality of links 411, 413, and 415. The plurality of links 411, 413, and 415 are similar to the plurality of links 211, 213, and 215.

The GRO 470 is configured to generate a node-VNF resource container connectivity matrix 480. The node-VNF resource container connectivity matrix 480 is similar to the node-VNF resource container connectivity matrix 280. The node-VNF resource container connectivity matrix 480 is configured to store connectivity details between the VNF forwarders 431, 433, and 435 and the VNF resource containers 441, 443, 445, and 447. For example, in the node-VNF resource container connectivity matrix 480 of the FIG. 4, a row 481 shows the connectivity details of the VNF forwarder 431 and the VNF resource containers 441, 443, 445, and 447. As shown in the node-VNF resource container connectivity matrix 480, a data entry "1" indicates that there is a connection between the VNF forwarders 431, 433, and 435 and the VNF resource containers 441, 443, 445, and 447, and the data entry "0" indicates that there is no connection between the VNF forwarders 431, 433, and 435 and the VNF resource containers 441, 443, 445, and 447. Further, the VNF forwarders 431, 433, and 435 are designated as "Node A," "Node B," and "Node C," respectively in a column 484 of the node-VNF resource container connectivity matrix 480. Similar to the row 481, a row 482 shows the connectivity details of the VNF forwarder 433 and the VNF resource containers 441, 443, 445, and 447, and a row 483 shows the connectivity details of the VNF forwarder 435 and the VNF resource containers 441, 443, 445, and 447. The VNF resource containers 441, 443, 445, and 447 are designated as "RC A," "RC B," "RC C," and "RC D," in columns 485, 486, 487, and 488, respectively in the node-VNF resource container connectivity matrix 480.

In an embodiment, each VNF forwarder 431, 433, and 435 is configured to send a VNF RC connectivity matrix update message to the GRO 470 using the plurality of links 411, 413, and 415, respectively. The structure of the VNF RC connectivity matrix update message will be discussed more fully below. The VNF RC connectivity matrix update messages comprise local connectivity data of the respective VNF forwarder 431, 433, and 435. For example, the local connectivity data sent by the VNF forwarder 431 indicates that the VNF forwarder 431 is connected to the VNF resource containers 441, and 443. The GRO 470 is configured to create the node-VNF resource container connectivity matrix 480 after receiving the VNF RC connectivity matrix update messages from all the VNF forwarders 431, 433, and 435. Therefore, the node-VNF resource container connectivity matrix 480 comprises all the local connectivity data of each VNF forwarder 431, 433, and 435. In this way, the GRO 470 comprises a central globalized view of all the VNF forwarders 431, 433, and 435 in the network and the connectivity details of the VNF forwarders 431, 433, and 435 to the VNF resource containers 441, 443, 4457, and 447.

Figures 5, 6:
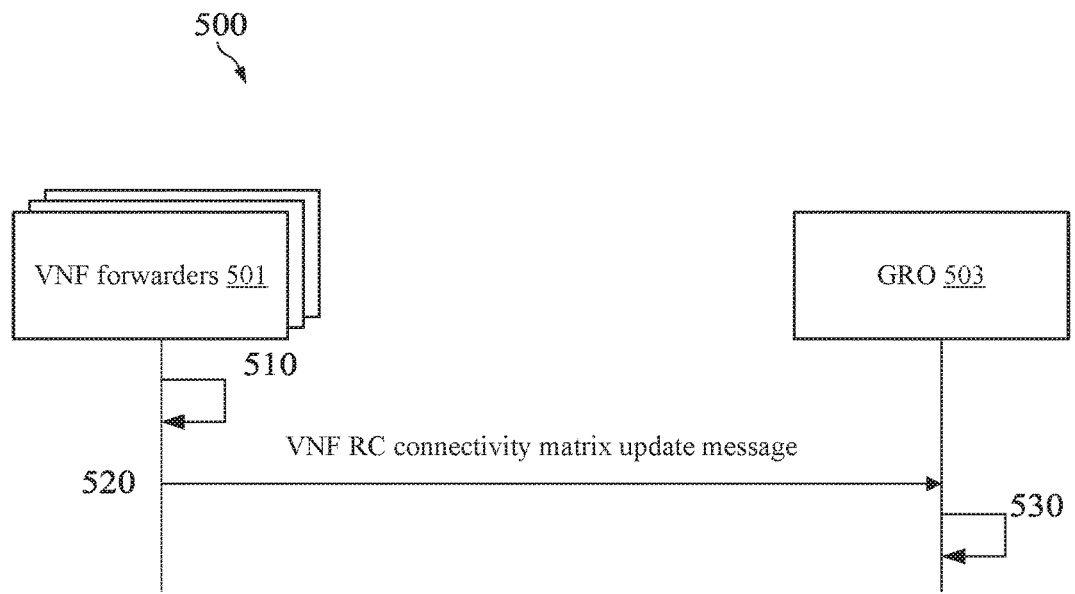
FIG. 5 is a protocol diagram of a node-VNF resource container connectivity matrix generation method according to an embodiment of the disclosure.
FIG. 6 is a syntax diagram of a VNF RC connectivity matrix update message according to an embodiment of the disclosure.

FIG. 5 is a protocol diagram of a node-VNF resource container connectivity matrix generation method 500. The method 500 is implemented between one or more VNF forwarders 501, such as the VNF forwarders 231, 233, and 235, and a GRO 503, such as the GROs 270. The method 500 is implemented when the GRO 503 needs to create the node-VNF resource container connectivity matrix and/or when there is a change in local connectivity data of the VNF forwarders 501. At step 510, each of the VNF forwarders 501 obtains local connectivity data for VNF resource containers, such as the VNF resource containers 241, 243, 245, and 247. At step 520, the VNF forwarders 501 integrate the local connectivity data into a VNF RC connectivity matrix update message and send the respective VNF RC connectivity matrix update message to the GRO 503. At step 530, the GRO 503 extracts the local connectivity data of each VNF forwarder 501, and generates the node-VNF resource container connectivity matrix, such as the node-VNF resource container connectivity matrix 480. It should be noted that the method 500 may be performed according to the steps as shown or alternatively configured as determined by a person of ordinary skill in the art to achieve similar functionalities.

FIG. 6 is a syntax diagram of a VNF RC connectivity matrix update message 600. The VNF RC connectivity matrix update message 600 is implemented to transmit the local connectivity data of an VNF forwarder, such as the VNF forwarders 231, 233, and 235 to a GRO, such as the GRO 270. The VNF RC connectivity matrix update message 600 is transmitted, by the VNF forwarder when the GRO needs to create the node-VNF resource container connectivity matrix and/or when there is a change in local connectivity data of the VNF forwarders. As shown in FIG. 6, the VNF RC connectivity matrix update message 600 comprises a header 610 designated as "RC Connectivity Update," and arguments 620, and 630. The argument 620 is an identifier of the VNF forwarder and designated as "Node ID." The argument 630 comprises a list of VNF resource container identifiers connected to the VNF forwarder. The GRO identifies that the received message is a VNF RC connectivity matrix update message using the header 610. The argument 620 indicates the VNF forwarder which the VNF RC connectivity matrix update message was sent. Finally, the GRO extracts the local connectivity data of the VNF forwarder from the argument 630. For example, considering the VNF forwarder 231, the local connectivity data included in the VNF RC connectivity matrix update message 600 sent by the VNF forwarder 231 comprises that the VNF forwarder 231 is connected to the VNF resource containers 241 and 243.

Figure 7:
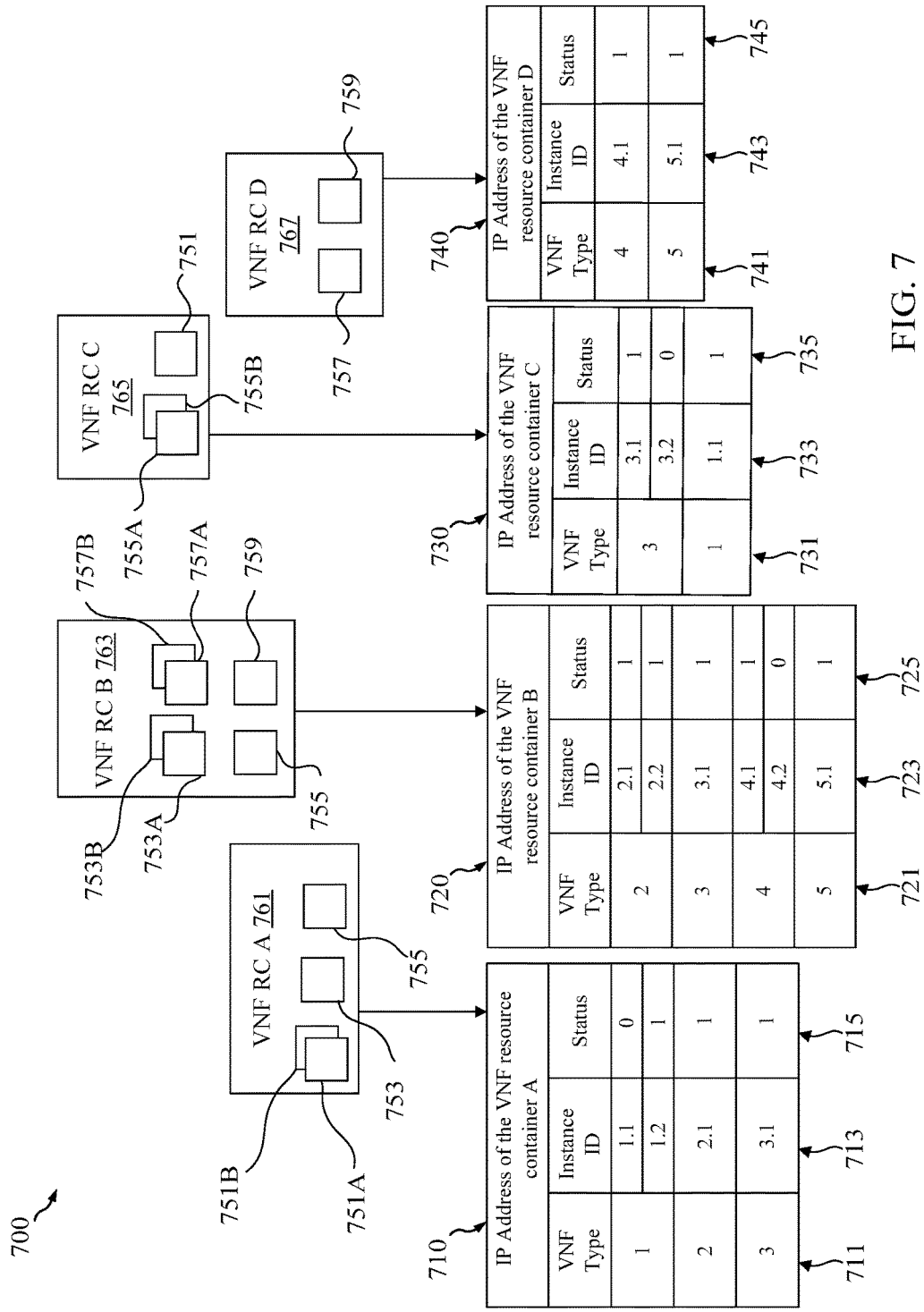
FIG. 7 is a schematic diagram of a plurality of VNF resource container tables generated by a plurality of VNF resource containers according to an embodiment of the disclosure.

FIG. 7 is a schematic diagram 700 of an embodiment of a plurality of VNF resource container tables 710, 720, 730, and 740 generated by a plurality of VNF resource containers 761, 763, 765, and 767. The plurality of VNF resource containers 761, 763, 765, and 767 are similar to the plurality of VNF resource containers 241, 243, 245, and 247. The plurality of VNF resource containers comprises one or more VNFIs 751A-B, 753A-B, 755A-B, 757A-B, and 759. The one or more VNFIs 751A-B, 753A-B, 755A-B, 757A-B, and 759 are similar to VNFIs 251A-B, 253A-B, 255A-B, 257A-B, and 259.

In an embodiment, the VNF resource container 761 generates the VNF resource container table 710. Similarly, the VNF resource container 763 generates the VNF resource container table 720, the VNF resource container 765 generates the VNF resource container table 730, and the VNF resource container 767 generates the VNF resource container table 740. In some embodiments, the VNF resource containers 761, 763, 765, and 767 generate the VNF resource container tables 710, 720, 730, and 740 periodically and/or when there is a change in the VNFI statuses of the VNFIs 751A-B, 753A-B, 755A-B, 757A-B, and 759. For example, the VNF resource containers 761, 763, 765, and 767 generate the VNF resource container tables 710, 720, 730, and 740 periodically according to a predefined schedule. For another example, the VNF resource containers 761, 763, 765, and 767 generate the VNF resource container tables 710, 720, 730, and 740 when the VNFI status of a respective VNFI 751A-B, 753A-B, 755A-B, 757A-B, and 759 included in one of the VNF resource containers 761, 763, 765, and 767 changes. In an embodiment, the VNFI status may be either "available" or "unavailable." A particular VNFI 751A-B, 753A-B, 755A-B, 757A-B, and 759 may be in an "available" state if the VNFI 751A-B, 753A-B, 755A-B, 757A-B, and 759 is idle. Further, the VNFI 751A-B, 753A-B, 755A-B, 757A-B, and 759 may be in an "unavailable" state if the VNFI 751A-B, 753A-B, 755A-B, 757A-B, and 759 is either taken (i.e., when a VNFI is providing services for another client request) or failed (i.e., when a VNFI fails due to a network event). Once created, the VNF resource containers 761, 763, 765, and 767 transmit the VNF resource container tables 710, 720, 730, and 740 to a corresponding VNF forwarder, such as the VNF forwarders 231, 233, and 235. In an embodiment, the VNF resource containers 761, 763, 765, and 767 transmit the VNF resource container tables 710, 720, 730, and 740 within a VNF resource container table update message, which will be discussed more fully below.

In an embodiment, each of the VNF resource container tables 710, 720, 730, and 740 may be identified by a header row comprising an IP address of the corresponding VNF resource container. For example, the header row of the VNF resource container table 710 comprises the IP address of the VNF resource container 761, the header row of the VNF resource container table 720 comprises the IP address of the VNF resource container 763, the header row of the VNF resource container table 730 comprises the IP address of the VNF resource container 765, and the header row of the VNF resource container table 740 comprises the IP address of the VNF resource container 767.

In an embodiment, a first column of a VNF resource container table 710, 720, 730, and 740 is designated as "VNF Type," and identifies a type of the VNFIs 751, 753, 755, 757, and 759 that are hosted by the corresponding VNF resource container 761, 763, 765, and 767. For example, a first column 711 of the VNF resource container table 710 comprises three different VNF types (i.e., 1, 2, and 3).

Similarly, a first column 721 of the VNF resource container table 720 comprises four different VNF types (i.e., 2, 3, 4, and 5), a first column 731 of the VNF resource container table 730 comprises two different VNF types (i.e., 3, and 1), and a first column 741 of the VNF resource container table 740 comprises two different VNF types (i.e., 4, and 5). In an embodiment, the VNF types 1, 2, 3, 4, and 5 are same as the VNFIs 751, 753, 755, 757, and 759, respectively.

In an embodiment, a second column of the VNF resource container table 710, 720, 730, and 740 is designated as "Instance ID," and includes an identifier that identifies the plurality of the VNFIs 751, 753, 755, 757, and 759. For example, a second column 713 of the VNF resource container table 710 comprises two identifiers of VNFI 1, one identifier of VNFI 2, and one identifier of VNFI 3. The two identifiers of VNFI 1, one identifier of VNFI 2, and one identifier of VNFI 3 are designated as 1.1, 1.2, 2.1, and 3.1, respectively in the second column 713. Similarly, a second column 723 of the VNF resource container table 720 comprises two identifiers of VNFI 2 (designated as 2.1 and 2.2), one identifier of VNFI 3 (designated as 3.1), two identifiers of VNFI 4 (designated as 4.1 and 4.2), and one identifiers of VNFI 5 (designated as 5.1). A second column 733 of the VNF resource container table 730 comprises two identifiers of VNFI 3 (designated as 3.1 and 3.2), and one identifier of VNFI 1 (designated as 1.1). Further, a second column 743 of the VNF resource container table 740 comprises one identifier of VNFI 4 (designated as 4.1), and one identifier of VNFI 5 (designated as 5.1). In an embodiment, the VNFI identifiers 1.1, 1.2, 2.1, 2.2, 3.1, 3.2, 4.1, and 4.2 represent the VNFIs 751A, 751B, 753A, 753B, 755A, 755B, 757A, and 757B, respectively.

In yet another embodiment, a third column of the VNF resource container table 710, 720, 730, and 740 is designated as "Status," and identifies the availability information of the VNFIs 751A-B, 753A-B, 755A-B, 757A-B, and 759. For example, a third column 715 of the VNF resource container table 710 comprises availability indication entries for VNFIs identified by the identifiers 1.1, 1.2, 2.1, and 3.1. Further, the availability indication entry "0" indicates that a particular VNFI is "unavailable" (for example VNFI 751A identified by the identifier 1.1 of VNF resource container table 710 is "unavailable"), and the availability indication entry "1" indicates that a particular VNFI is "available" (for example VNFIs 751B, 753A, 755A identified by the identifiers 1.2, 2.1, 3.1 of the VNF resource container table 710 are "available"). Similar to the third column 715, a third column 725 of the VNF resource container table 720 comprises availability information for VNFIs 753A, 753B, 755A, 757A, 757B, and 759 identified by the identifiers 2.1, 2.2, 3.1, 4.1, 4.2, and 5.1. All the VNFIs except for VNFI 757B identified by the identifier 4.2 are indicated as being in an "available" state in the VNF resource container table 720, where VNFI 757B identified by the identifier 4.2 is in an "unavailable" state. Similarly, a third column 735 of the VNF resource container table 730 and a third column 745 of the VNF resource container table 740 comprises the availability information of the VNFIs 755A, 755B, 751A identified by the identifiers 3.1, 3.2, and 1.1 of the VNF resource container 765, and the availability information of the VNFIs 757A, and 759 identified by the identifiers 4.1, and 5.1 of the VNF resource container 767. In an embodiment, the VNFIs 755A, 751A, 757A, and 759 identified by the identifiers 3.1, 1.1, 4.1, and 5.1 in the VNF resource containers 765, and 767 are in the "available" status, while the VNFI 755B identified by the identifier 3.2 in the VNF resource container 765 is in the "unavailable" state.

FIG. 8 is a protocol diagram of a VNF resource container table update method 800. The method 800 is implemented between, a VNF resource container 801, such as the VNF resource containers 241, 243, 245, and 247, an VNF forwarder 803, such as the VNF forwarders 231, 233, and 235, and a GRO 805, such as the GRO 270. The method 800 is implemented when the VNF resource container 801 creates a VNF resource container table, such as the VNF resource container tables 291, 293, 295, and 297 in a predefined time and/or when there is a change in a VNFI status. At step 810, the VNF resource container 801 obtains a respective VNF resource container table and generates the VNF resource container table update message. For example, the VNF resource container table update message comprises the VNF resource container table. At step 820, the VNF resource container 801 sends the generated VNF resource container table update message to the corresponding VNF forwarder 803. At step 830, the VNF forwarder 803 updates the VNF resource container table update message by adding the identifier of the VNF forwarder 803. At step 840, the SF forwarder 803 sends the updated VNF resource container table update message to the GRO 805. Finally, at step 850, the GRO 805 extracts and stores the VNF resource container table. It should be noted that the method 800 may be performed according to the steps as shown or alternatively configured as determined by a person of ordinary skill in the art to achieve similar functionalities.

FIG. 9 is a syntax diagram of a VNF resource container table update message 900. The VNF resource container table update message 900 is implemented to transmit the details of a VNF resource container, such as the VNF resource containers 241, 243, 245, and 247 to a VNF forwarder, such as the VNF forwarders 231, 233, and 235. The VNF resource container table update message 900 is generated and transmitted by the VNF resource container when the VNF resource container creates a VNF resource container table in a predefined time and/or when there is a change in a VNFI status. As shown in FIG. 9, the VNF resource container table update message 900 comprises a header 910 designated as "RC Table Update," and arguments 920, 930, 940, 950, and 960. The argument 920 is an identifier of the VNF resource container and designated as "Container ID." The argument 930 is another header of a data set that is designated as "VNF Resource Container." The data set included in the argument 930 comprises the details of associated VNF types in the VNF resource container that is identified by the "Container ID." The argument 940 is designated as "VNF Type," and identifies the VNF type. The argument 940 comprises the argument 950 designated as "VNF Instance ID" that identifies the plurality of the VNFIs, and the argument 960 designated as "Instance Status" that describe status of the VNFI identified by the "VNF Instance ID." The VNF forwarder identifies that the received message is a VNF resource container table update message using the header 910. The VNF forwarder is configured to update the VNF resource container table update message by adding the identifier of the VNF forwarder after the VNF forwarder receives the VNF resource container table update message.

FIG. 10 is a syntax diagram of an updated VNF resource container table update message 1000. The updated VNF resource container table update message 1000 is similar to the VNF resource container table update message 900, except that the updated VNF resource container table update message 1000 is sent by a VNF forwarder to a GRO and includes an identifier of the VNF forwarder. The updated VNF resource container table update message 1000 is implemented to transmit the details of a VNF resource container, such as the VNF resource containers 241, 243, 245, and 247 by a VNF forwarder, such as the VNF forwarders 231, 233, and 235 to a GRO, such as the GRO 270. The updated VNF resource container table update message 1000 is transmitted by the VNF forwarder when the VNF forwarder receives a VNF resource container table update message, such as the VNF resource container table update message 900.

In an embodiment, header 1010 is same as header 910, and a plurality of arguments 1030, 1040, 1050, 1060, and 1070 are similar to the arguments 920, 930, 940, 950, and 960, respectively. As shown in FIG. 10, the updated VNF resource container table update message 1000 comprises similar fields and arguments as the VNF resource container table update message 900, except that the updated VNF resource container table update message 1000 comprises an additional argument 1020 designated as "Node ID." The argument 1020 includes an identifier of the VNF forwarder and is added by the VNF forwarder to indicate the identity of the transmitting VNF forwarder to the GRO. In an embodiment, the GRO extracts and stores VNF resource container table, such as the VNF resource container tables 291, 293, 295, and 297 from the updated VNF resource container table update message 1000.

Figure 11:
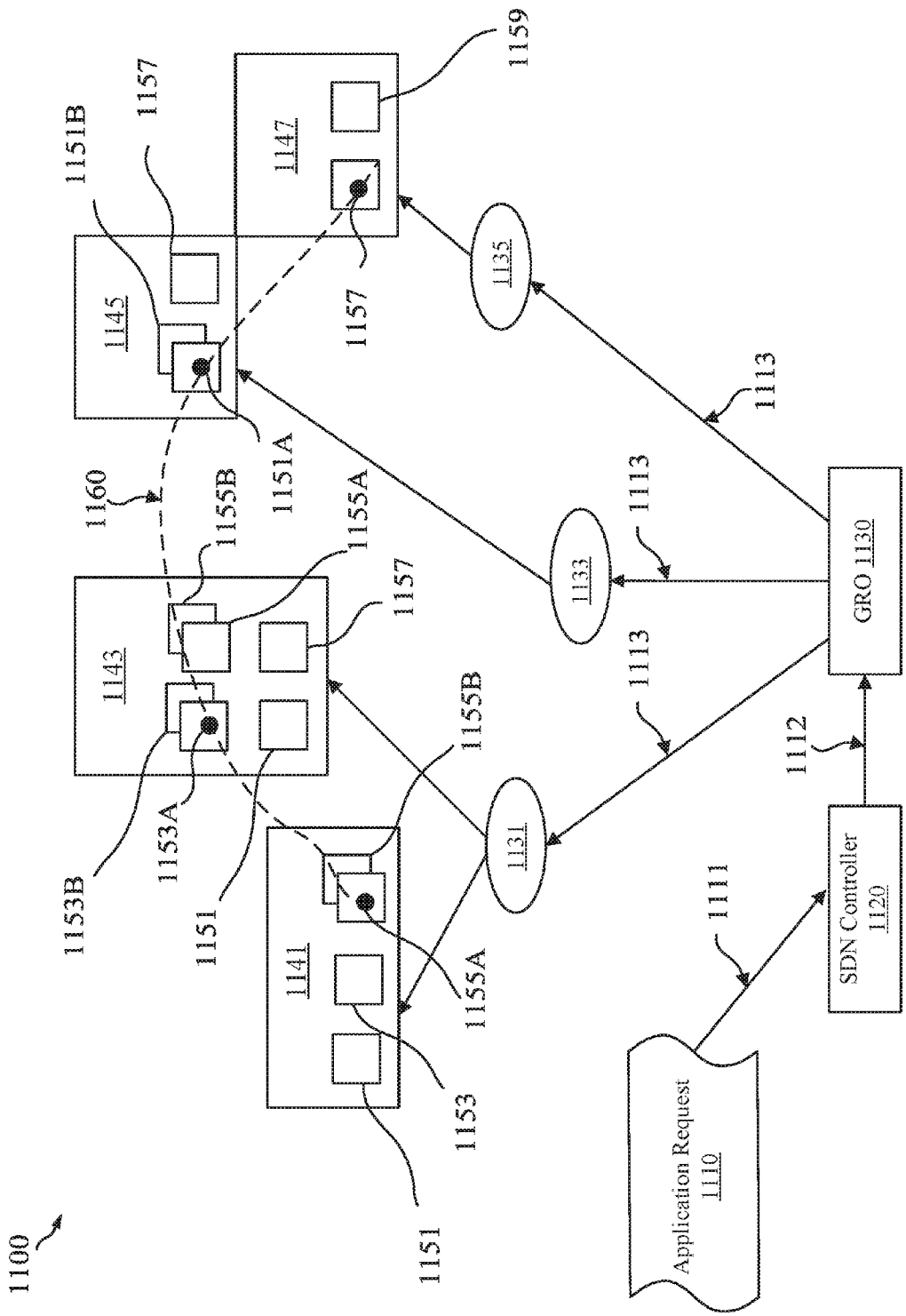
FIG. 11 is a schematic diagram of a calculation method of an optimal sequence of VNFIs of a VNF chain according to an embodiment of the disclosure.

FIG. 11 is a schematic diagram of an embodiment of a calculation method 1100 of an optimal sequence of VNFIs of a VNF chain. The method 1100 is implemented between an SDN controller 1120, a GRO 1130, a plurality of VNF forwarders 1131, 1133, and 1135, and a plurality of VNF resource containers 1141, 1143, 1145, and 1147. The SDN controller 1120 is similar to the SDN controller 110. The GRO 1130 is similar to the GRO 270 and comprises a node-VNF resource container connectivity matrix, such as the node-VNF resource container connectivity matrix 280, and a plurality of VNF resource container tables, such as the VNF resource container tables 291, 293, 295, and 297. The VNF forwarders 1131, 1133, and 1135 are similar to the VNF forwarders 231, 233, and 235. The plurality of VNF resource containers 1141, 1143, 1145, and 1147 are similar to the VNF resource containers 241, 243, 245, and 247. In an embodiment, the VNF resource containers 1141, 1143, 1145, and 1147 comprise a plurality of VNFIs 1151A-B, 1153A-B, 1155A-B, 1157, and 1159 which is similar to the VNFIs 251A-B, 253A-B, 255A-B, 257A-B, and 259.

In an embodiment, the method 1100 is implemented when the GRO 1130 receives a request for calculating an optimal sequence of VNFIs 1160 to fulfil a VNF chain comprising a sequence of network services requested by a client. At step 1111, an application of a client sends an application request 1110 to the SDN controller 1120. The application request 1110 comprises required VNFs of the client in an order known as a VNF chain (for example, a VNF chain may be an ordered list of VNF types: 1155-1153-1151-1157). At step 1112, the SDN controller 1120 instructs the GRO 1130 to calculate the optimal sequence of VNFIs 1160 in order to complete the VNF chain 1155-1153-1151-1157 of the application request 1110. The GRO 1130 assigns a subset of VNFIs 1151A-B, 1153A-B, 1155A-B, 1157, and 1159 to fulfil each of the VNFs in the VNF chain 1155-1153-1151-1157 using the availability details in the node-VNF resource container connectivity matrix and the plurality of VNF resource container tables. In an embodiment, the GRO 1120 may generate traffic steering rules for routing the traffic of the client along the optimal sequence of VNFIs 1160 required by the requested network services. For example, the GRO 1130 assigns VNFI 1155A from the VNF resource container 1141 that is attached to the VNF forwarder 1131 to fulfil the VNF 1155. Similarly, the GRO 1130 assigns VNFI 1153A from the VNF resource container 1143 that is attached to the VNF forwarder 1131 to fulfil the VNF 1153, and assigns VNFI 1151A from the VNF resource container 1145 that is attached to the VNF forwarder 1133 to fulfil the VNF 1151. Finally, the GRO 1130 assigns VNFI 1157 from the VNF resource container 1147 that is attached to the VNF forwarder 1135 to fulfil the VNF 1157. In this way, the GRO 1130 calculates the optimal sequence of VNFIs 1160 to fulfil the VNF chain 1155-1153-1151-1157. After calculating the optimal sequence of VNFIs 1160, the GRO 1130 generates traffic steering rules for routing the traffic of the client along the selected VNFIs 1155A, 1153A, 1151A, and 1157. At step 1113, the GRO 1130 pushes the details of the selected VNFIs 1155A, 1153A, 1151A, and 1157 to the corresponding VNF forwarders 1131, 1133, and 1135 such that the VNF forwarders 1131, 1133, and 1135 are aware of the routing instructions of the traffic of the client. It should be noted that the method 1100 may be performed according to the steps as shown or alternatively configured as determined by a person of ordinary skill in the art to achieve similar functionalities.

Figure 12:
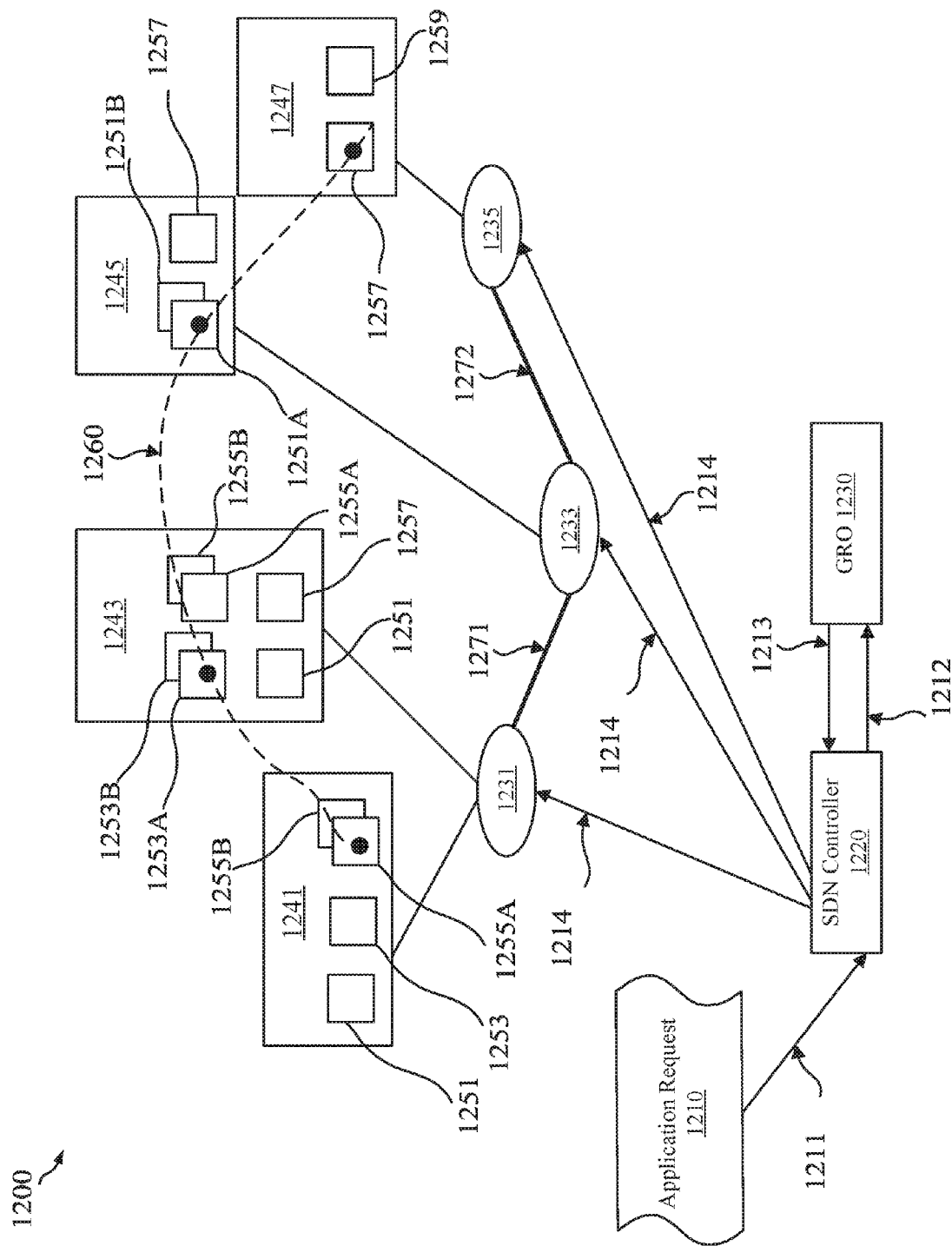
FIG. 12 is a schematic diagram of a VNF chain path provisioning method according to an embodiment of the disclosure.

FIG. 12 is a schematic diagram of an embodiment of a VNF chain path provisioning method 1200. The method 1200 is implemented between an SDN controller 1220, a GRO 1230, a plurality of VNF forwarders 1231, 1233, and 1235, and a plurality of VNF resource containers 1241, 1243, 1245, and 1247. The SDN controller 1220 is similar to the SDN controller 110. The GRO 1230 is similar to the GRO 270 and comprises a node-VNF resource container connectivity matrix, such as the node-VNF resource container connectivity matrix 280, and a plurality of VNF resource container tables, such as the VNF resource container tables 291, 293, 295, and 297. The VNF forwarders 1231, 1233, and 1235 are similar to the VNF forwarders 231, 233, and 235. The plurality of VNF resource containers 1241, 1243, 1245, and 1247 are similar to the VNF resource containers 241, 243, 245, and 247. In an embodiment, the VNF resource containers 1241, 1243, 1245, and 1247 comprise a plurality of VNFIs 1251A-B, 1253A-B, 1255A-B, 1257, and 1259 which is similar to the VNFIs 251A-B, 253A-B, 255A-B, 257A-B, and 259. In an embodiment, the VNF forwarder 1231 is coupled to the VNF forwarder 1233 using a link 1271, and the VNF forwarder 1233 is coupled to the VNF forwarder 1235 using a link 1272. The links 1271 and 1272 are similar to the links 211, 213, 215, 221, 223, 225, and 227.

In an embodiment, the method 1200 is implemented when the SDN controller 1220 receives a request for calculating a VNF chain comprising a sequence of network services required by a client, such as the client 160. At step 1211, an application of a client sends an application request 1210 to the SDN controller 1220. The application request 1210 comprises a VNF chain (for example, a VNF chain may be an ordered list of VNF types: 1255-1253-1251-1257). At step 1212, the SDN controller 1220 queries the GRO 1130 to calculate an optimal sequence of VNFIs 1260 in order to complete the VNF chain 1255-1253-1251-1257 of the application request 1210. The optimal sequence of VNFIs 1260 is similar to the optimal sequence of VNFIs 1160. The method of calculating the optimal sequence of VNFIs 1260 is similar to the method 1100. At step 1213, the GRO 1230 informs the SDN controller 1220 about a sequence of the VNF forwarders 1231, 1233, and 1235 that corresponds to the application request 1210 after the GRO 1230 calculates the optimal sequence of VNFIs 1260 to fulfil the VNF chain 1255-1253-1251-1257. For example, the sequence of the VNF forwarders 1231, 1233, and 1235 for the application request 1210 is "VNF forwarder 1231→VNF forwarder 1233→VNF forwarder 1235." In an embodiment, the GRO 1220 is configured to store the sequence of the VNF forwarders 1231, 1233, and 1235 for the application request 1210 and send a response message to the client indicating that the network is ready to receive the traffic of the client. At step 1214, the SDN controller 1220 sets up the VNF forwards 1231, 1233, and 1235 according to the stored sequence of the VNF forwarders 1231, 1233, and 1235. The setting up process of the VNF forwarders 1231, 1233, and 1235 will be discussed more fully below. It should be noted that the method 1200 may be performed according to the steps as shown or alternatively configured as determined by a person of ordinary skill in the art to achieve similar functionalities.

Figure 13:
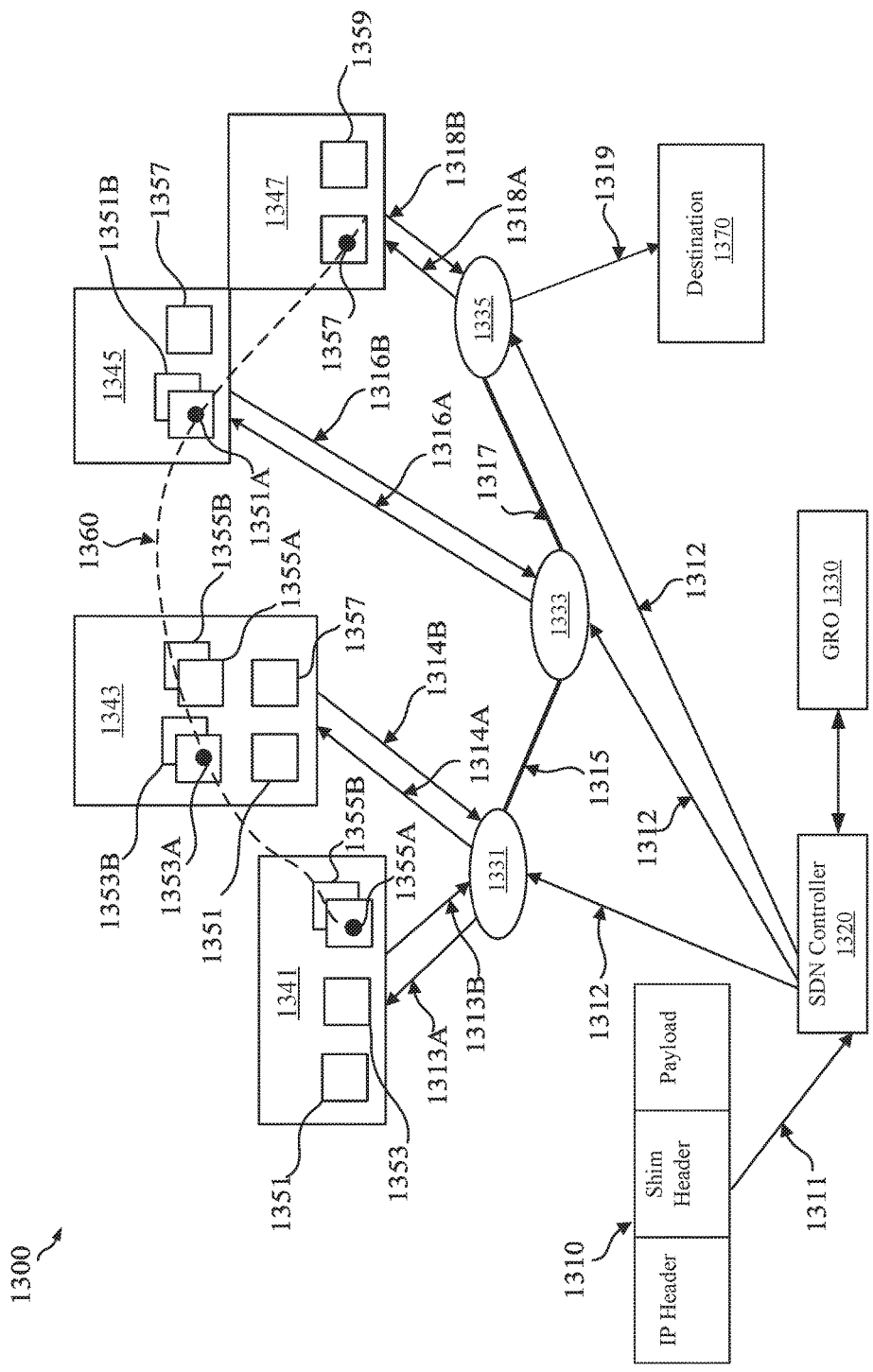
FIG. 13 is a schematic diagram of a VNF-enabled packet forwarding method according to an embodiment of the disclosure.

FIG. 13 is a schematic diagram of an embodiment of a VNF-enabled packet forwarding method 1300. The method 1300 is implemented between an SDN controller 1320, a GRO 1330, a plurality of VNF forwarders 1331, 1333, and 1335, a plurality of VNF resource containers 1341, 1343, 1345, and 1347, and a destination 1370. The SDN controller 1320 is similar to the SDN controller 110. The GRO 1330 is similar to the GRO 270 and comprises a node-VNF resource container connectivity matrix, such as the node-VNF resource container connectivity matrix 280, and a plurality of VNF resource container tables, such as the VNF resource container tables 291, 293, 295, and 297. The VNF forwarders 1331, 1333, and 1335 are similar to the VNF forwarders 231, 233, and 235. The plurality of VNF resource containers 1341, 1343, 1345, and 1347 are similar to the VNF resource containers 241, 243, 245, and 247. In an embodiment, the VNF resource containers 1341, 1343, 1345, and 1347 comprise a plurality of VNFIs 1351A-B, 1353A-B, 1355A-B, 1357, and 1359 which is similar to the VNFIs 251A-B, 253A-B, 255A-B, 257A-B, and 259. In an embodiment, the destination 1370 may be a client, such as the client 160 configured to receive a data packet.

In an embodiment, the method 1300 is implemented after the GRO 1330 performs the method 1100 (i.e., calculating an optimal sequence of VNFIs 1360 (for example, VNFIs 1355A, 1353A, 1351A, and 1357) of a VNF chain (for example, VNF chain 1355-1353-1351-1357)) and both the SDN 1320 and the GRO 1330 perform the method 1200 (for example, VNF chain 1355-1353-1351-1357 path provisioning "VNF forwarder 1331→VNF forwarder 1333→VNF forwarder 1335"). At step 1311, the client sends a data packet 1310 comprising an IP Header, Shim Header, and a Payload. The Shim Header comprises the application identifier of the client. At step 1312, the SDN controller 1320 identifies an application ID of the data packet 1310 from the Shim Header and forwards the data packet 1310 to the VNF forwarder 1331. In this embodiment, the step 1312 is performed based on the example VNF chain path provisioning calculated by performing the method 1200. At step 1313A, the VNF forwarder 1331 forwards the data packet 1310 to the VNF resource container 1341 to get the VNFI 1355A to perform the VNF 1355. At step 1313B, the VNF forwarder 1331 receives the data packet 1310 from the VNF resource container 1341 after VNF 1355 has been performed on the data packet 1310. At step 1314A, the VNF forwarder 1331 forwards the data packet 1310 to the VNF resource container 1343 to get the VNFI 1353A to perform the VNF 1353. At step 1314B, the VNF forwarder 1331 receives the data packet 1310 from the VNF resource container 1343 after VNF 1353 has been performed on the data packet 1310. At step 1315, the VNF forwarder 1331 forwards the data packet 1310 to the VNF forwarder 1333.

At step 1316A, the VNF forwarder 1333 forwards the data packet 1310 to the VNF resource container 1345 to get the VNFI 1351A to perform the VNF 1351. At step 1316B, the VNF forwarder 1333 receives the data packet 1310 from the VNF resource container 1345. At step 1317, the VNF forwarder 1333 forwards the data packet 1310 to the VNF forwarder 1335 after VNF 1351 has been performed on the data packet 1310. Similarly, at step 1318A, the VNF forwarder 1335 forwards the data packet 1310 to the VNF resource container 1347 to get the VNFI 1357 to perform VNF 1357. At step 1318B, the VNF forwarder 1335 receives the data packet 1310 from the VNF resource container 1347 after VNF 1357 has been performed on the data packet 1310. At step 1319, the VNF forwarder 1335 forwards the data packet 1310 to the destination 1370. In this way, the SDN controller 1320, the GRO 1330, the plurality of VNF forwarders 1331, 1333, and 1335, and the plurality of VNF resource containers 1341, 1343, 1345, and 1347 perform the required VNFs on the data packet 1310, and forward the processed data packet 1310 to the destination 1370.

Figure 14:
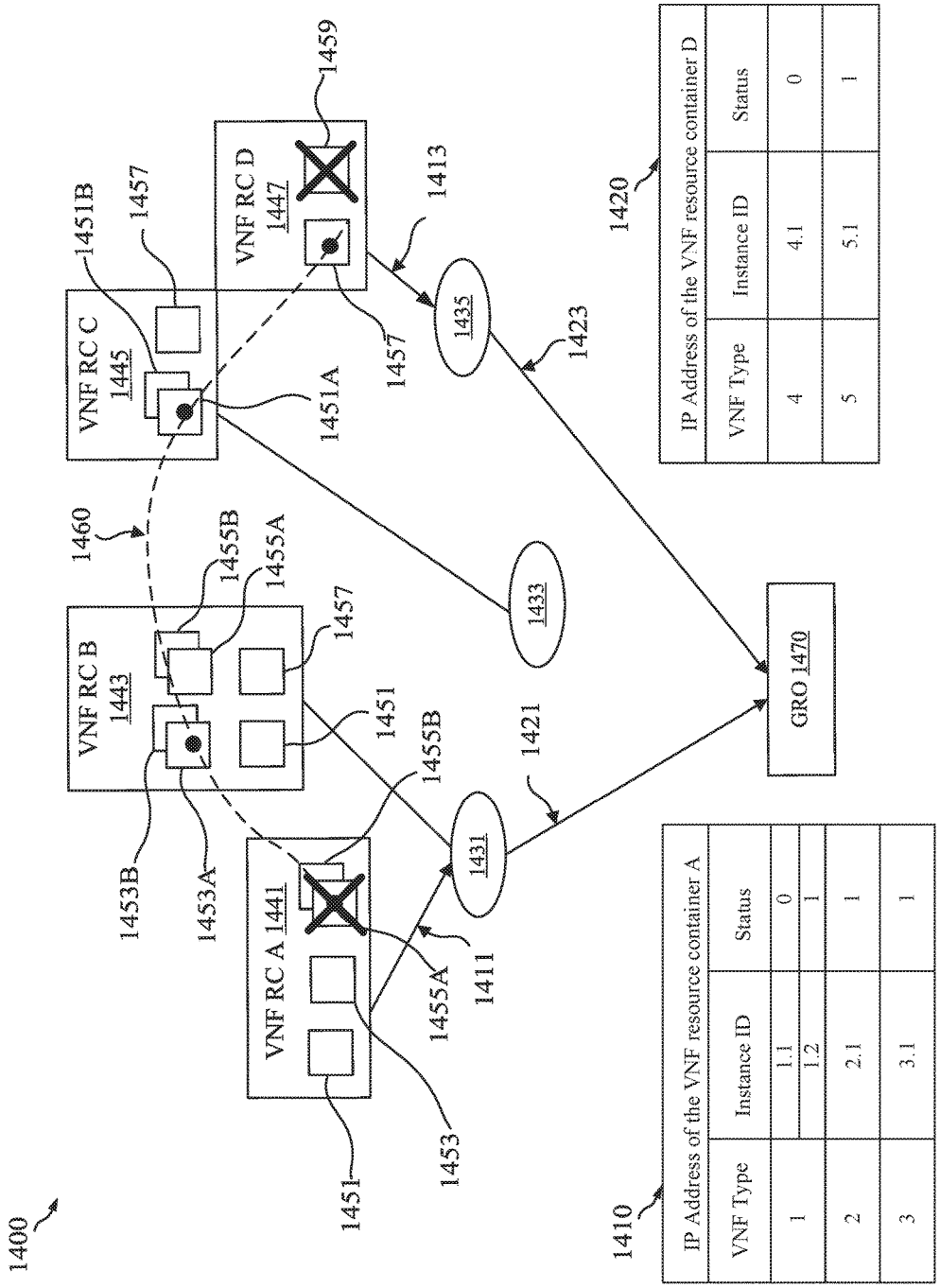
FIG. 14 is a schematic diagram of a VNFI status notification method according to an embodiment of the disclosure.

FIG. 14 is a schematic diagram of an embodiment of a VNFI status notification method 1400. The method 1400 is implemented between a GRO 1470, a plurality of VNF forwarders 1431, 1433, and 1435, and a plurality of VNF resource containers 1441, 1443, 1445, and 1447. The GRO 1470 is similar to the GRO 270 and comprises a node-VNF resource container connectivity matrix, such as the node-VNF resource container connectivity matrix 280, and a plurality of VNF resource container tables, such as the VNF resource container tables 291, 293, 295, and 297. The VNF forwarders 1431, 1433, and 1435 are similar to the VNF forwarders 231, 233, and 235. The plurality of VNF resource containers 1441, 1443, 1445, and 1447 are similar to the VNF resource containers 241, 243, 245, and 247. In an embodiment, the VNF resource containers 1441, 1443, 1445, and 1447 comprise a plurality of VNFIs 1451A-B, 1453A-B, 1455A-B, 1457, and 1459 which is similar to the VNFIs 251A-B, 253A-B, 255A-B, 257A-B, and 259.

The method 1400 is implemented after the GRO 1470 performs the method 1100, where the GRO calculates an optimal sequence of VNFIs 1460 (for example, VNFIs 1455A, 1453A, 1451A, and 1457) of a VNF chain (for example, VNF chain 1455-1453-1451-1457). In some embodiments, a VNFI may become unavailable due to a network event, such as VNFI reconfiguration. For example, the VNFI 1455A hosted by the VNF resource container 1441 and the VNFI 1459 hosted by the VNF resource container 1447 may become unavailable. In such embodiments, the VNF resource containers 1441 and 1447 are configured to generate a resource container table update messages 900. For example, at step 1411, the VNF resource container 1441 generates the resource container table update message 900 and forwards the message 900 to the VNF forwarder 1431 when the VNFI 1455A becomes unavailable. Similarly, at step 1413, the VNF resource container 1447 generates another resource container table update message 900 and forwards the other resource container table update message 900 to the VNF forwarder 1435 when the VNFI 1459 become unavailable.

At step 1421, the VNF forwarder 1431 updates the resource container table update message 900 by adding the node identifier of the VNF forwarder 1431, and sends an updated VNF resource container table update message 1000 to the GRO 1470. Similarly, at step 1423, the VNF forwarder 1435 updates the other resource container table update message 900 by adding the node identifier of the VNF forwarder 1435, and sends another updated VNF resource container table update message 1000 to the GRO 1470. In these embodiments, VNF resource containers 1441, and 1447 update the VNF resource container tables dynamically and therefore the resource container table update messages 900 comprises only the information relative to the VNFIs that changed the statuses. In an embodiment, the GRO 1470 updates the VNF resource container tables according to the received updated VNF resource container table update messages 1000. For example, as shown in FIG. 14, a table 1410 and a table 1420, represent the updated VNF resource container table corresponding to the VNF resource container 1441, and the updated VNF resource container table corresponding to the VNF resource container 1447, respectively.

Figure 15:
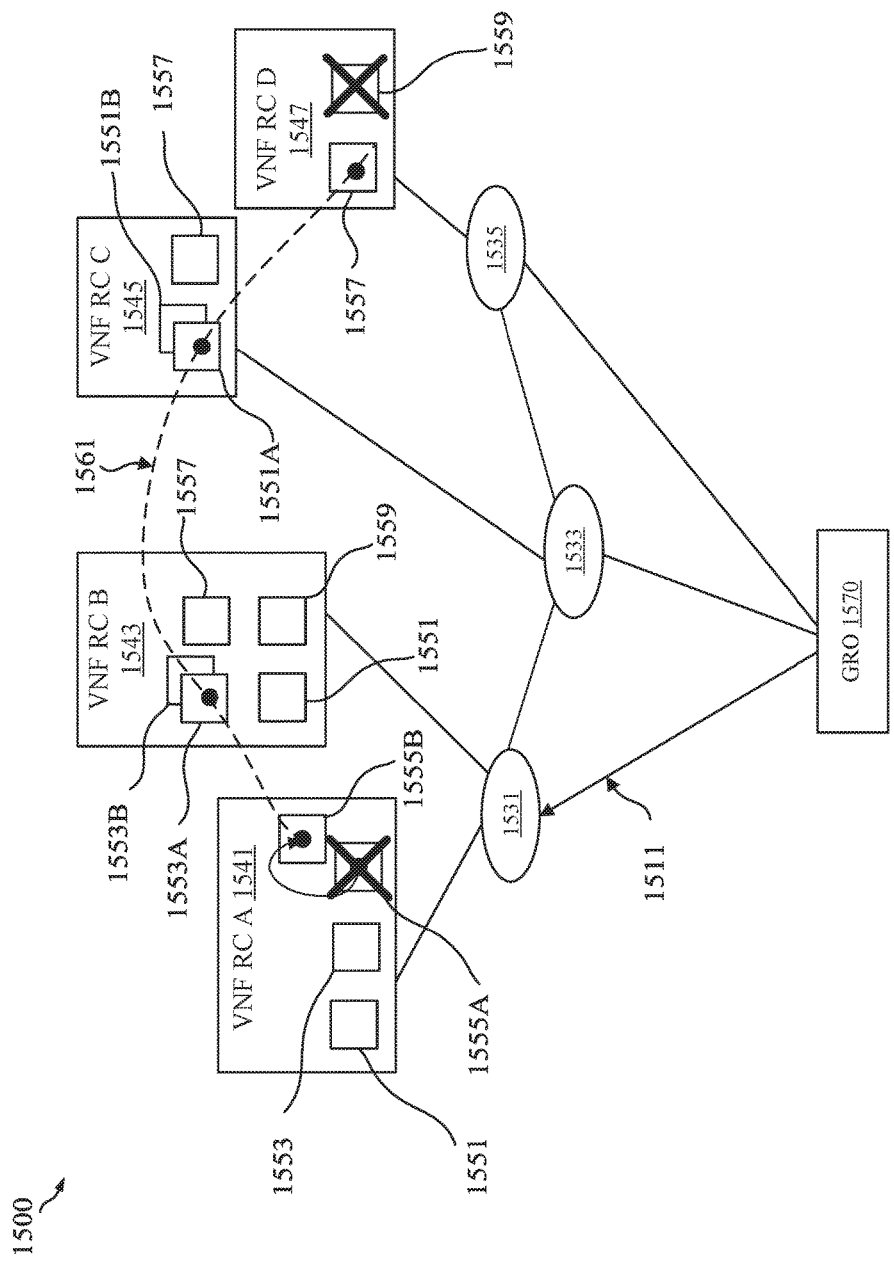
FIG. 15 is a schematic diagram of a re-calculation method of an optimal sequence of VNFIs of a VNF chain according to an embodiment of the disclosure.

FIG. 15 is a schematic diagram of an embodiment of a method 1500 of a re-calculation of an optimal sequence of VNFIs of a VNF chain. The method 1500 is implemented between a GRO 1570, a plurality of VNF forwarders 1531, 1533, and 1535, a plurality of VNF resource containers 1541, 1543, 1545, and 1547. The GRO 1570 is similar to the GRO 270 and comprises a node-VNF resource container connectivity matrix, such as the node-VNF resource container connectivity matrix 280, and a plurality of VNF resource container tables, such as the VNF resource container tables 291, 293, 295, and 297. The VNF forwarders 1531, 1533, and 1535 are similar to the VNF forwarders 231, 233, and 235. The plurality of VNF resource containers 1541, 1543, 1545, and 1547 are similar to the VNF resource containers 241, 243, 245, and 247. In an embodiment, the VNF resource containers 1541, 1543, 1545, and 1547 comprise a plurality of VNFIs 1551A-B, 1553A-B, 1555A-B, 1557, and 1559 which is similar to the VNFIs 251A-B, 253A-B, 255A-B, 257A-B, and 259. In an embodiment, the GRO 1570 had already calculated an optimal sequence of VNFIs 1561 of a VNF chain 1555-1553-1551-1557. The optimal sequence of VNFIs 1561 of the VNF chain 1555-1553-1551-1557 is similar to the optimal sequence of VNFIs 1160.

In an embodiment, the method 1500 is implemented when at least one of the VNFIs 1551A-B, 1553A-B, 1555A-B, 1557, and 1559 in the already calculated optimal sequence of VNFIs 1561 of the VNF chain 1555-1553-1551-1557 becomes unavailable. For example, in some embodiments, the VNFI 1555A in the VNF resource container 1541, and the VNFI 1559 in the VNF resource container 1547 may become unavailable due to a network event, such as VNFI reconfiguration. The corresponding VNF resource containers 1541 and 1547 send the VNF resource container table update messages 900 in order to update the GRO 1570 as soon as the VNFIs 1555A and 1559 become unavailable. The GRO 1570 updates the plurality of VNF resource container tables according to the received updated messages. After updating the plurality of VNF resource container tables, the GRO 1570 assigns a new VNFI 1555B for the unavailable VNFI 1555A since the VNFI 1555A belongs to the optimal sequence of VNFIs 1561. In this embodiment, there is no need to re-calculate a new optimal sequence of VNFIs to fulfil the VNF chain 1155-1153-1151-1157 because the unavailable VNFI 1555A can be replaced with a VNFI 1555B in the same VNF resource container 1541. The GRO 1570 generates new traffic steering rules for routing the traffic of the client along the selected VNFIs 1555B, 1553A, 1551A, and 1157 after replacing the unavailable VNFI 1555A with the VNFI 1555B. At step 1511, the GRO 1570 pushes the traffic steering rules indicating to get the VNFI 1555B in the VNF resource container 1541 to the VNF forwarder 1531. In this embodiment, the VNFI replacement is simple since a VNFI of same kind was available in the same VNF resource container.

Figure 16:
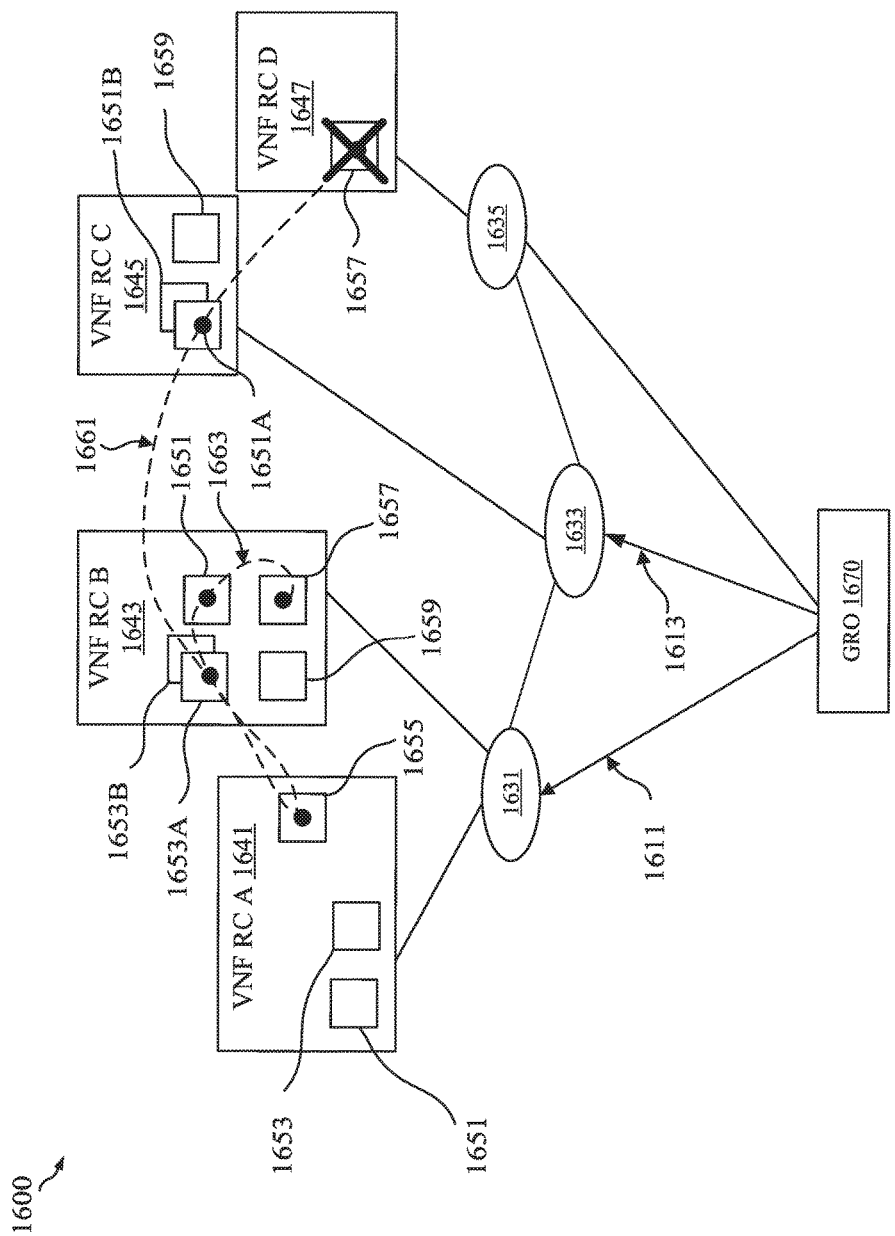
FIG. 16 is a schematic diagram of a re-calculation method of an optimal sequence of VNFIs of a VNF chain according to another embodiment of the disclosure.

FIG. 16 is a schematic diagram of an embodiment of a method 1600 of a re-calculation of an optimal sequence of VNFIs of a VNF chain. The method 1600 is similar to the method 1500 except that the method 1600 requires a VNFI replacement from a different VNF resource container. The method 1600 is implemented between a GRO 1670, a plurality of VNF forwarders 1631, 1633, and 1635, a plurality of VNF resource containers 1641, 1643, 1645, and 1647. The GRO 1670 is similar to the GRO 270 and comprises a node-VNF resource container connectivity matrix, such as the node-VNF resource container connectivity matrix 280, and a plurality of VNF resource container tables, such as the VNF resource container tables 291, 293, 295, and 297. The VNF forwarders 1631, 1633, and 1635 are similar to the VNF forwarders 231, 233, and 235. The plurality of VNF resource containers 1641, 1643, 1645, and 1647 are similar to the VNF resource containers 241, 243, 245, and 247. In an embodiment, the VNF resource containers 1641, 1643, 1645, and 1647 comprise a plurality of VNFIs 1651A-B, 1653A-B, 1655, 1657, and 1659 which is similar to the VNFIs 251A-B, 253A-B, 255A-B, 257A-B, and 259. In an embodiment, the GRO 1670 had already calculated an optimal sequence of VNFIs 1661 of a VNF chain 1655-1653-1651-1657. The optimal sequence of VNFIs 1661 of the VNF chain 1655-1653-1651-1657 is similar to the optimal sequence of VNFIs 1160.

In an embodiment, the method 1600 is implemented when at least one of the VNFIs 1651A-B, 1653A-B, 1655, 1657, and 1659 in the already calculated optimal sequence of VNFIs 1661 of the VNF chain 1655-1653-1651-1657 becomes unavailable. For example, in an embodiment, the VNFI 1657 in the VNF resource container 1647 may become unavailable due to a network event. The corresponding VNF resource container 1647 sends the VNF resource container table update message 900 in order to update the GRO 1670 as soon as the VNFI 1657 becomes unavailable or periodically. The GRO 1670 updates the VNF resource container table stored at the GRO 1670 according to the received updated message. After updating the VNF resource container table, the GRO 1670 assigns a new VNFI 1657 from the VNF resource container 1643 for the unavailable VNFI 1657 in the VNF resource container 1647.

In this embodiment, the GRO 1670 replaces the VNFI 1651A in the VNF resource container 1645 with a new VNFI 1651 from the VNF resource container 1643 in order to generate the shortest VNF chain path. Therefore, the GRO 1670 generates a new optimal sequence of VNFIs 1663. Since all the selected VNFIs 1655, 1653A, 1651, and 1657 are comprised in the VNF resource containers 1641, and 1643, the previous sequence of the VNF forwarders 1631, 1633, and 1635 for VNF chain path which is "VNF forwarder 1631→VNF forwarder 1633→VNF forwarder 1635" is now reduced to only "VNF forwarder 1631." The GRO 1670 is further configured to re-calculate traffic steering rules with respect to the new optimal sequence of VNFIs 1663. In step 1611, the GRO 1670 forwards the traffic steering rules corresponding to the VNF forwarder 1631 such that the VNF forwarder 1631 forwards the traffic to the VNF resource containers 1641 and 1645 to complete the VNF chain request. In step 1613, the GRO 1670 forwards the traffic steering rules corresponding to the VNF forwarder 1633. The traffic steering rules corresponding to the VNF forwarder 1633 indicates that the VNF forwarder 1633 does not need to take any action regarding the forgoing traffic. In this embodiment, VNFI replacement can be considered as complex since a VNFI of same kind was unavailable in the same VNF resource container, and the GRO 1670 had to calculate the new optimal sequence of VNFIs.

Figure 17:
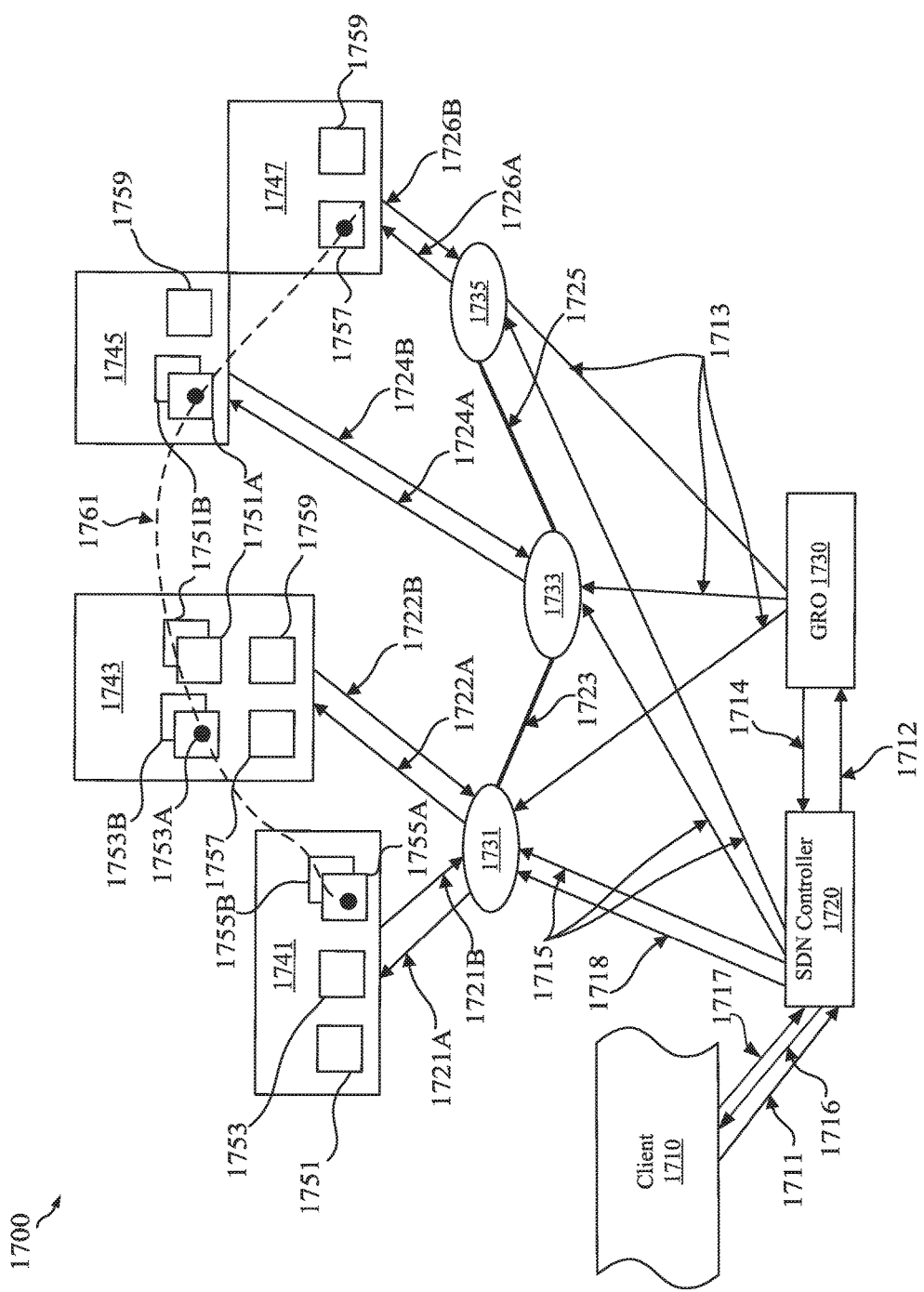
FIG. 17 is a schematic diagram of a VNF-enabled packet forwarding method according to an embodiment of the disclosure.

FIG. 17 is a schematic diagram of an embodiment of a VNF-enabled packet forwarding method 1700. The method 1700 is used to implement a system, such as the system 200. As shown in FIG. 17 the method 1700 is implemented between a client 1710, an SDN controller 1720, a GRO 1730, a plurality of VNF forwarders 1731, 1733, and 1735, and a plurality of VNF resource containers 1741, 1743, 1745, and 1747. The client 1710 is similar to the client 160. The SDN controller 1720 is similar to the SDN controller 110. The GRO 1730 is similar to the GRO 270. The plurality of VNF forwarders 1731, 1733, and 1735, and the plurality of VNF resource containers 1741, 1743, 1745, and 1747 are similar to the plurality of VNF forwarders 231, 233, and 235, and the plurality of VNF resource containers 241, 243, 245, and 247, respectively. In an embodiment, the VNF resource containers 1741, 1743, 1745, and 1747 comprise a plurality of VNFIs 1751A-B, 1753A-B, 1755A-B, 1757A-B, and 1759 which is similar to the VNFIs 251A-B, 253A-B, 255A-B, 257A-B, and 259. In an embodiment, the method 1700 is employed when the SDN controller receives a VNF service request from the client 1710.

At step 1711, the client 1710 sends an application request (for example, a VNF service chain request including a sequence of VNFs 1755, 1753, 1751, and 1757 to be perform) to the SDN controller 1720. At step 1712, the SDN controller 1720 creates a "query" message including the performing order of the VNFs in the VNF chain request and network topology details as a network constraint, and sends the "query" message to the GRO 1730. The details about the "query" message will be discussed more fully below. In an embodiment, the network topology details may comprise network element connectivity details, and included constraints may be "avoid traffic forwarding from the VNF forwarder 1731 to the VNF forwarder 1735," since there is no direct connection between the VNF forwarder 1731 and the VNF forwarder 1735. The GRO 1730 calculates an optimal sequence of VNFIs 1761 of the VNF chain 1755-1753-1751-1757 when the GRO 1730 receives the query message from the SDN controller 1720. In an embodiment, the optimal sequence of VNFIs 1761 comprises VNFIs 1755A, 1753A, 1751A, 1757, respectively. The GRO 1730 further calculates a VNF chain path considering the network constrain received by the SDN controller's 1720 "query" message. For example, the GRO 1730 calculates the VNF chain path "VNF forwarder 1731→VNF forwarder 1733→VNF forwarder 1735" to perform the calculated optimal sequence of VNFIs 1761 for the VNF chain 1755-1753-1751-1757. At step 1713, the GRO 1720 forwards information about the selected VNFIs 1755A, 1753A, 1751A, 1757 in a "push" message to each of the VNF forwarders 1731, 1733, and 1735. In an embodiment, the information regarding the VNFIs include the identifiers of the selected VNFIs and identifiers of the hosting VNF resource containers. The details about the "push" message will be discussed more fully below.

The GRO 1730 further calculates traffic steering rules for each of the VNF forwarders 1731, 1733, and 1735. In an embodiment, the traffic steering rules includes the routing details for the client's 1710 traffic. For example, the traffic steering rules in this embodiment includes the calculated VNF chain path "VNF forwarder 1731→VNF forwarder 1733→VNF forwarder 1735." At step 1714, the GRO 1730 forwards the traffic steering rules as a "reply" message to the SDN controller 1720. At step 1715, the SDN controller 1720 creates and transmits a "setup" message to the VNF forwarders 1731, 1733, and 1735 indicating the routing details for the client's 1710 traffic. At step 1716, the SDN controller 1720 creates and transmits a response message to the client 1710 indicating that the system is ready to accept and perform the VNFs for the client's 1710 traffic. At step 1717, the client 1710 sends the traffic to the SDN controller 1720. At step 1718 the SDN controller 1720 forwards the client's 1710 traffic to the appropriate VNF forwarders 1731, 1733, and 1735. For example, the SDN controller 1720 forwards the client's 1710 traffic to the VNF forwarder 1731. At step 1721A, the VNF forwarder 1731 forwards the client's 1710 traffic to the VNF resource container 1741 to perform the VNF 1755 using the VNFI 1755A. At step 1721B, the VNF forwarder 1731 receives the client's 1710 traffic after the VNF resource container 1741 perform the VNF 1755 using the VNFI 1755A.

At step 1722A, the VNF forwarder 1731 forwards the client's 1710 traffic to the VNF resource container 1743 to perform the VNF 1753 using the VNFI 1753A. At step 1722B, the VNF forwarder 1731 receives the client's 1710 traffic after the VNF resource container 1743 perform the VNF 1753 using the VNFI 1753A. At step 1723, the VNF forwarder 1731 forwards the client's 1710 traffic to the VNF forwarder 1733. At step 1724A, the VNF forwarder 1733 forwards the client's 1710 traffic to the VNF resource container 1745 to perform the VNF 1751 using the VNFI 1751A. At step 1724B, the VNF forwarder 1733 receives the client's 1710 traffic after the VNF resource container 1745 performs the VNF 1751. At step 1725, the VNF forwarder 1733 forwards the client's 1710 traffic to the VNF forwarder 1735. At step 1726A, the VNF forwarder 1735 forwards the client's 1710 traffic to the VNF resource container 1747 to perform the VNF 1757 using the VNFI 1857. At step 1726B, the VNF forwarder 1735 receives the client's 1710 traffic after the VNF resource container 1747 performs the VNF 1757. In this way, the method 1700 performs the VNFs on client's 1710 traffic. It should be noted that the method 1700 may be performed according to the steps as shown or alternatively configured as determined by a person of ordinary skill in the art to achieve similar functionalities.

Figure 18:
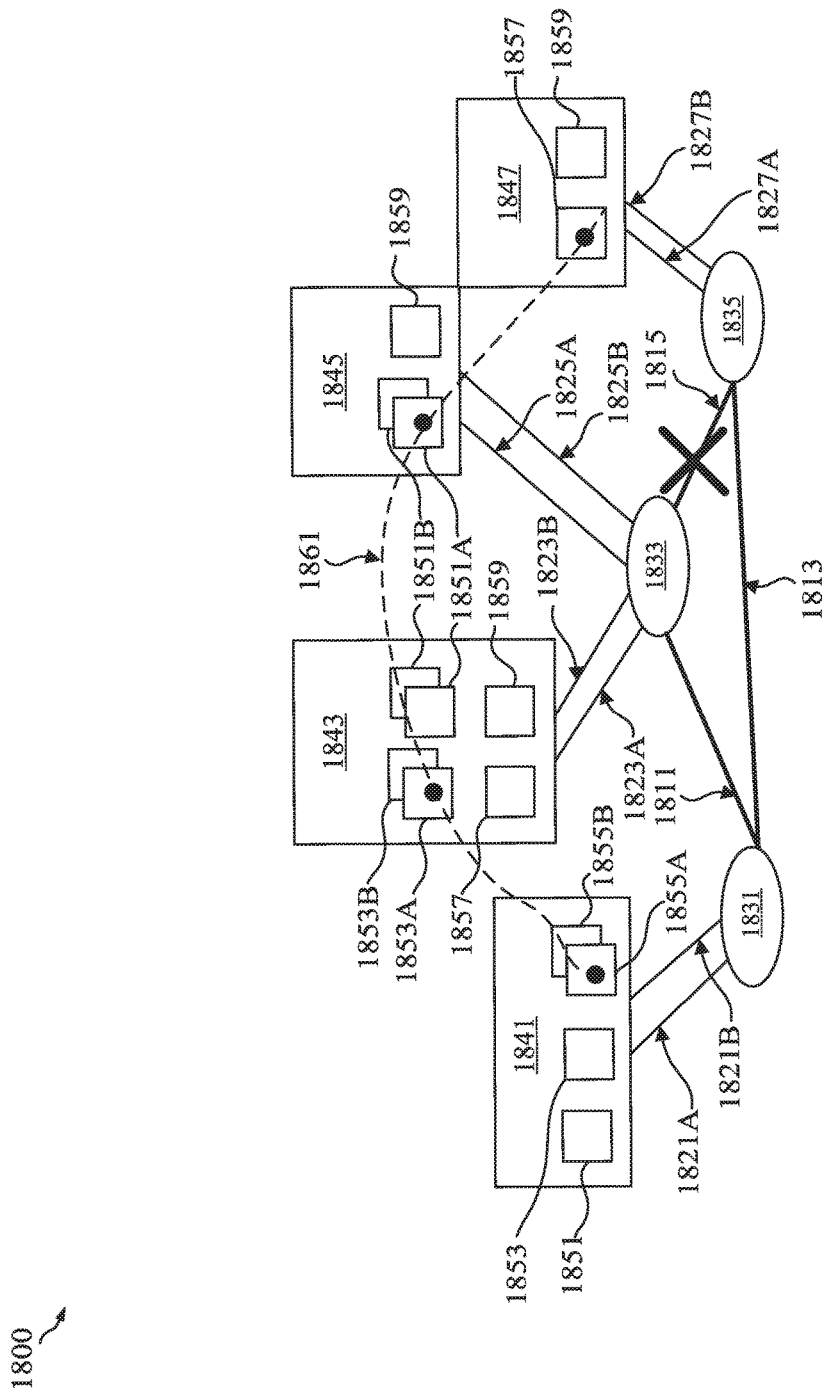
FIG. 18 is a schematic diagram of a portion of a VNF chain network system according to an embodiment of the disclosure.

FIG. 18 is a schematic diagram of an embodiment of a portion of a VNF chain network system 1800. The system 1800 is similar to the VNF chain network system 200. In an embodiment, the system 1800 comprises a plurality of VNF forwarders 1831, 1833, and 1835, and a plurality of VNF resource containers 1841, 1843, 1845, and 1847. The plurality of VNF forwarders 1831, 1833, and 1835 are similar to the plurality of VNF forwarders 231, 233, and 235. The plurality of VNF resource containers 1841, 1843, 1845, and 1847 are similar to the plurality of VNF resource containers 241, 243, 245, and 247. In an embodiment, the VNF resource containers 1841, 1843, 1845, and 1848 comprise a plurality of VNFIs 1851A-B, 1853A-B, 1855A-B, 1857A-B, and 1859 which is similar to the VNFIs 251A-B, 253A-B, 255A-B, 257A-B, and 259. The VNF forwarder 1831 is coupled to the VNF forwarders 1833 and 1835 using links 1811, and 1813, respectively. The VNF forwarder 1833 is coupled to the VNF forwarder 1835 using a link 1815. The links 1811, 1813, and 1815 are similar to the links 211, 213, and 215. The VNF forwarders 1831, 1833, and 1835 are coupled to each other in order to forward traffic of a client, such as the client 160, in order to complete VNF services. Additionally, the plurality of VNF forwarders 1831, 1833, and 1835 are coupled to the plurality of VNF resource containers 1841, 1843, 1845, and 1847 using a plurality of links 1821A, 1821B, 1823A, 1823B, 1825A, 1825B, 1827A, and 1827B. For example, the VNF resource container 1841 is coupled to the VNF forwarder 1831 using the links 1821A and 1821B. Similarly, the VNF resource container 1843 is coupled to the VNF forwarder 1833 using the links 1823A and 1823B, the VNF resource container 1845 is coupled to the VNF forwarder 1833 using the links 1825A and 1825B, and the VNF resource container 1847 is coupled to the VNF forwarder 1835 using the links 1827A and 1827B. The plurality of links 1821A, 1821B, 1823A, 1823B, 1825A, 1825B, 1827A, and 1827B are similar to the links 211, 213, and 215.

In an embodiment, a GRO, such as the GRO 270, calculates an optimal sequence of VNFIs 1861 of a VNF chain 1855-1853-1851-1857. The optimal sequence of VNFIs 1861 comprises VNFIs 1855A, 1853A, 1851A, and 1858, respectively. Further, the optimal sequence of VNFIs 1861 is similar to the optimal sequence of VNFIs 1761. In an embodiment, the links 1821A, 1823A, 1825A, and 1827A are used to forward the traffic from the plurality of VNF forwarders 1831, 1833, and 1835 to the plurality of VNF resource containers 1841, 1843, 1845, and 1847 to perform the VNFIs 1855A, 1853A, 1851A, and 1857. In another embodiment, the links 1821B, 1823B, 1825B, and 1827B are used to forward the traffic from the plurality of VNF resource containers 1841, 1843, 1845, and 1847 to the plurality of VNF forwarders 1831, 1833, and 1835 after the traffic perform the VNFIs 1855A, 1853A, 1851A, 1858.

In an embodiment, an SDN controller, such as the SDN controller 110 receives the network resource conditions such as the inter connectivity details of the VNF forwarders 1831, 1833, and 1835 or the topology information of the network elements from the network update process. In such embodiment, the SDN controller includes the topology constraints when querying the GRO to calculate the optimal sequence of VNFIs 1861 of the VNF chain 1855-1853-1851-1857. For example, as shown in FIG. 18, the link 1815 may break due to a network event such as reconfiguration, and the SDN controller receives information indicating that there is no direct connection between the VNF forwarder 1833 and the VNF forwarder 1835. Hence, the SDN controller include a constraint indicating to "avoid traffic forwarding from the VNF forwarder 1833 to the VNF forwarder 1835" into the query instruction when querying the GRO to calculate the optimal sequence of VNFIs 1861. The GRO considers the constraint to "avoid traffic forwarding from the VNF forwarder 1833 to the VNF forwarder 1835" when calculating the optimal sequence of VNFIs 1861. Therefore, the GRO calculates a VNF chain path for the optimal sequence of VNFIs 1861 in the order of: VNF forwarder 1831→VNF forwarder 1833→VNF forwarder 1831→VNF forwarder 1835.

Figure 19:
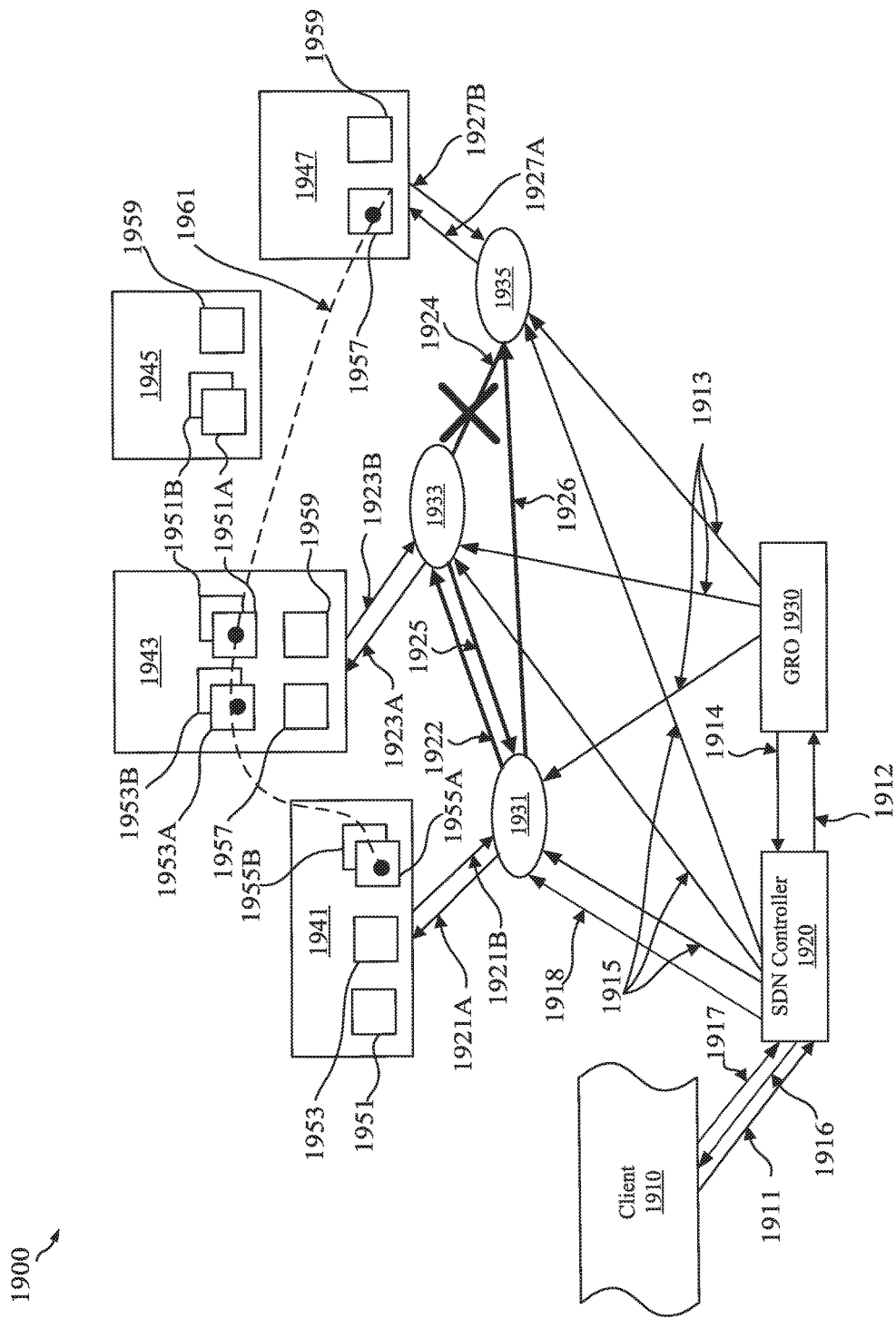
FIG. 19 is a schematic diagram of a VNF-enabled packet forwarding method according to an embodiment of the disclosure.

FIG. 19 is a schematic diagram of an embodiment of a VNF-enabled packet forwarding method 1900. The method 1900 is used to implement a system, such as the system 200. As shown in FIG. 19 the method 1900 is implemented between a client 1910, an SDN controller 1920, a GRO 1930, a plurality of VNF forwarders 1931, 1933, and 1935, and a plurality of VNF resource containers 1941, 1943, 1945, and 1947. The client 1910 is similar to the client 160. The SDN controller 1920 is similar to the SDN controller 110. The GRO 1930 is similar to the GRO 270. The plurality of VNF forwarders 1931, 1933, and 1935, and the plurality of VNF resource containers 1941, 1943, 1945, and 1947 are similar to the plurality of VNF forwarders 231, 233, and 235, and the plurality of VNF resource containers 241, 243, 245, and 247, respectively. In an embodiment, the VNF resource containers 1941, 1943, 1945, and 1947 comprise a plurality of VNFIs 1951A-B, 1953A-B, 1955A-B, 1957A-B, and 1959 which is similar to the VNFIs 251A-B, 253A-B, 255A-B, 257A-B, and 259. In an embodiment, the method 1900 is employed when the SDN controller receives a VNF service request from the client 1910 and/or VNF forwarder interconnection details of the network changes. For example, interconnection between the VNF forwarder 1933 and the VNF forwarder 1935 fails due to a network event such as reconfiguration.

At step 1911, the client 1910 sends an application request (for example, a VNF service chain request including a sequence of VNFs 1955,1953, 1951, and 1957 to be perform) to the SDN controller 1920. At step 1912, the SDN controller 1920 creates a "query" message including the performing order of the VNFs in the VNF chain request and network topology details as a network constraint, and sends the "query" message to the GRO 1930. The details about the "query" message will be discussed more fully below. In an embodiment, the network topology details may comprise network element connectivity details, and included constraints may indicate "avoid traffic forwarding from the VNF forwarder 1933 to the VNF forwarder 1935," since there is no direct connection between the VNF forwarder 1933 and the VNF forwarder 1935. The GRO 1930 calculates an optimal sequence of VNFIs 1961 of the VNF chain 1955-1953-1951-1957 when the GRO 1930 receives the query message from the SDN controller 1920. In an embodiment, the optimal sequence of VNFIs 1961 comprises VNFIs 1955A, 1953A, 1951A, and 1957, respectively. The GRO 1930 further calculates a VNF chain path considering the network constrain received by the SDN controller's 1920 "query" message. For example, the GRO 1930 calculates the VNF chain path "VNF forwarder 1931→VNF forwarder 1933→VNF forwarder 1931→VNF forwarder 1935" to perform the calculated optimal sequence of VNFIs 1961 for the VNF chain 1955-1953-1951-1957. At step 1913, the GRO 1920 forwards information about the selected VNFIs 1955A, 1953A, 1951A, and 1959 in a "push" message to each of the VNF forwarders 1931, 1933, and 1935. In an embodiment the information regarding the VNFIs include identifiers of the selected VNFIs and the identifiers of the hosting VNF resource containers. The details about the "push" message will be discussed more fully below.

The GRO 1930 further calculates traffic steering rules for each of the VNF forwarders 1931, 1933, and 1935. In an embodiment, the traffic steering rules includes the routing details for the client's 1910 traffic. For example, the traffic steering rules in this embodiment includes the calculated VNF chain path "VNF forwarder 1931→VNF forwarder 1933→VNF forwarder 1931→VNF forwarder 1935." At step 1914, the GRO 1930 forwards the traffic steering rules as a "reply" message to the SDN controller 1920. At step 1915, the SDN controller 1920 creates and transmits a "setup" message to the VNF forwarders 1931, 1933, and 1935 indicating the routing details for the client's 1910 traffic. At step 1916, the SDN controller 1920 creates and transmits a response message to the client 1910 indicating that the system is ready to accept and perform the VNF services for the client's 1910 traffic. At step 1917, the client 1910 sends the traffic to the SDN controller 1920. At step 1918 the SDN controller 1920 forwards the client's 1910 traffic to the appropriate VNF forwarders 1931, 1933, and 1935. For example, the SDN controller 1920 forwards the client's 1910 traffic to the VNF forwarder 1931. At step 1921A, the VNF forwarder 1931 forwards the client's 1910 traffic to the VNF resource container 1941 to perform the VNF 1955 using the VNFI 1955A. At step 1921B, the VNF forwarder 1931 receives the client's 1910 traffic after the VNF resource container 1941 perform the VNF 1955 using the VNFI 1955A.

At step 1922, the VNF forwarder 1931 forwards the client's 1910 traffic to the VNF forwarder 1933. At step 1923A, the VNF forwarder 1933 forwards the client's 1910 traffic to the VNF resource container 1943 to perform the VNFs 1953 and 1951 using the VNFIs 1953A and 1951A. At step 1923B, the VNF forwarder 1933 receives the client's 1910 traffic after the VNF resource container 1943 performs the VNFs 1953 and 1951. At step 1925, the VNF forwarder 1933 forwards the client's 1910 traffic back to the VNF forwarder 1931. At step 1926, the VNF forwarder 1931 forwards the client's 1910 traffic to the VNF forwarder 1935. At step 1927A, the VNF forwarder 1935 forwards the client's 1910 traffic to the VNF resource container 1947 to perform the VNF 1957 using the VNF 1957. At step 1927B, the VNF forwarder 1935 receives the client's 1910 traffic after the VNF resource container 1947 performs the VNF 1957. In this way, the method 1900 performs the VNF services on client's 1910 traffic. It should be noted that the method 1900 may be performed according to the steps as shown or alternatively configured as determined by a person of ordinary skill in the art to achieve similar functionalities.

FIG. 20 is a protocol diagram of a VNF-enabled packet forwarding method 2000.

The method 2000 is implemented between an SDN controller 2001, such as the SDN controller 110, a GRO 2003, such as the GRO 270, and a VNF forwarder 2005, such as the VNF forwarders 231, 233, 235. The method 2000 is implemented when the SDN controller receives a VNF service request from a client, such as the client 160 and/or the network topology changes. At step 2010, the SDN controller 2001 queries the GRO 2003 using a "query" message. The SDN controller 2001 is configured to generate the "query" message that includes a performing order of the VNFs requested by the client and the network topology details. The GRO 2003 is configured to calculate an optimal sequence of VNFIs according to the performing order of the VNFs requested by the client. At step 2020, the GRO 2003 sends details of the selected VNFIs as a "push" message to the VNF forwarder 2005. The GRO 2003 is further configured to generate traffic steering rules according to the network topology information sent in the "query" message. At step 2030, the GRO 2003 sends the traffic steering rules as a "reply" message to the SDN controller 2001. At step 2040, the SDN controller generates a "setup" message according to the received traffic steering rules sent in the "reply" message and transmits to the VNF forwarder 2005. It should be noted that the method 2000 may be performed according to the steps as shown or alternatively configured as determined by a person of ordinary skill in the art to achieve similar functionalities.

FIG. 21 is a syntax diagram of a "query" message 2100. The "query" message 2100 is implemented to transmit a VNF chain of the VNFs requested by the client and the network topology details to a GRO, such as the GRO 270. The "query" message 2100 is transmitted by the SDN controller when the SDN controller receives a VNF service request from a client and/or the network topology changes. As shown in FIG. 21, the "query" message 2100 comprises a header 2110 designated as "query," and arguments 2120, 2130, and 2140. The header "query" indicates to the GRO that the received message is a "query" message. The argument 2120 is an identifier of the client's application and designated as "APP ID." The argument 2130 comprises a VNF service chain that is requested by the client. Finally, the argument 2140 comprises the network topology details as is known by the SDN controller. Once received, the GRO extracts the information in the "query" message to generate an optimal sequence of VNFIs and traffic steering rules.

FIG. 22 is a syntax diagram of a "push" message 2200. The "push" message 2200 is implemented to transmit details of selected VNFIs in an optimal sequence of VNFIs to a VNF forwarder, such as the VNF forwarders 231, 233, and 235. The "push" message 2200 is transmitted by the GRO when the GRO calculates the optimal sequence of VNFIs from a VNF service request from a client and/or the network topology changes. As shown in FIG. 22, the "push" message 2200 comprises a header 2210 designated as "push," and arguments 2220, 2230, 2240, and 2250. The header "push" indicates to the VNF forwarder that the received message is a "push" message. The argument 2220 is an identifier of the client's application and designated as "APP ID." The argument 2230 is an identifier of the VNF forwarder and designated as "Node ID." The argument 2240 is another header and comprises an identifier of a VNF resource container, and the argument 2240 is designated as "RC ID." Finally, the argument 2250 comprises an identifier of the selected VNFI which is hosted by the VNF resource container identified by "RC ID."

FIG. 23 is a syntax diagram of a "reply" message 2300. The "reply" message 2300 is implemented to transmit a VNF chain path that is calculated by a GRO, such as the GRO 270, to an SDN controller, such as the SDN controller 110. The "reply" message 2300 is transmitted by the GRO when the GRO calculates the VNF chain path with respect to a calculated optimal sequence of VNFIs. As shown in FIG. 23, the "reply" message 2300 comprises a header 2310 designated as "reply," and arguments 2320, 2330, and 2340. The header "reply" indicates to the SDN controller that the received message is a "reply" message. The argument 2320 is an identifier of a client's application and designated as "APP ID." The argument 2330 comprises the VNF chain path calculated by the GRO. Finally, the argument 2340 comprises the VNF forwarders that is included in the VNF chain path. Once received, the SDN controller extracts the information in "reply" message to generate "setup" message.

FIG. 24 is a syntax diagram of a "setup" message 2400. The "setup" message 2400 is implemented to transmit setup details that generated by an SDN controller, such as the SDN controller 110, to a VNF forwarder, such as the VNF forwarders 231, 233, and 235. The "setup" message 2400 is transmitted by the SDN controller when the SDN controller generates the set up details according to a received "reply" message. As shown in FIG. 24, the "setup" message 2400 comprises a header 2410 designated as "setup," and arguments 2420, 2430, and 2440. The header 2410 indicates to each VNF forwarder that the received message is a "setup" message. The argument 2420 is an identifier of a label switched path (LSP) and designated as "LSP ID." The argument 2430 is an identifier of a client's application and designated as "APP ID." The argument 2440 is an ERO and allows the SDN controller to define the path specified by the received VNF chain path in "reply" message. Once received, the VNF forwarders can completely route the client's traffic.

Figure 25:
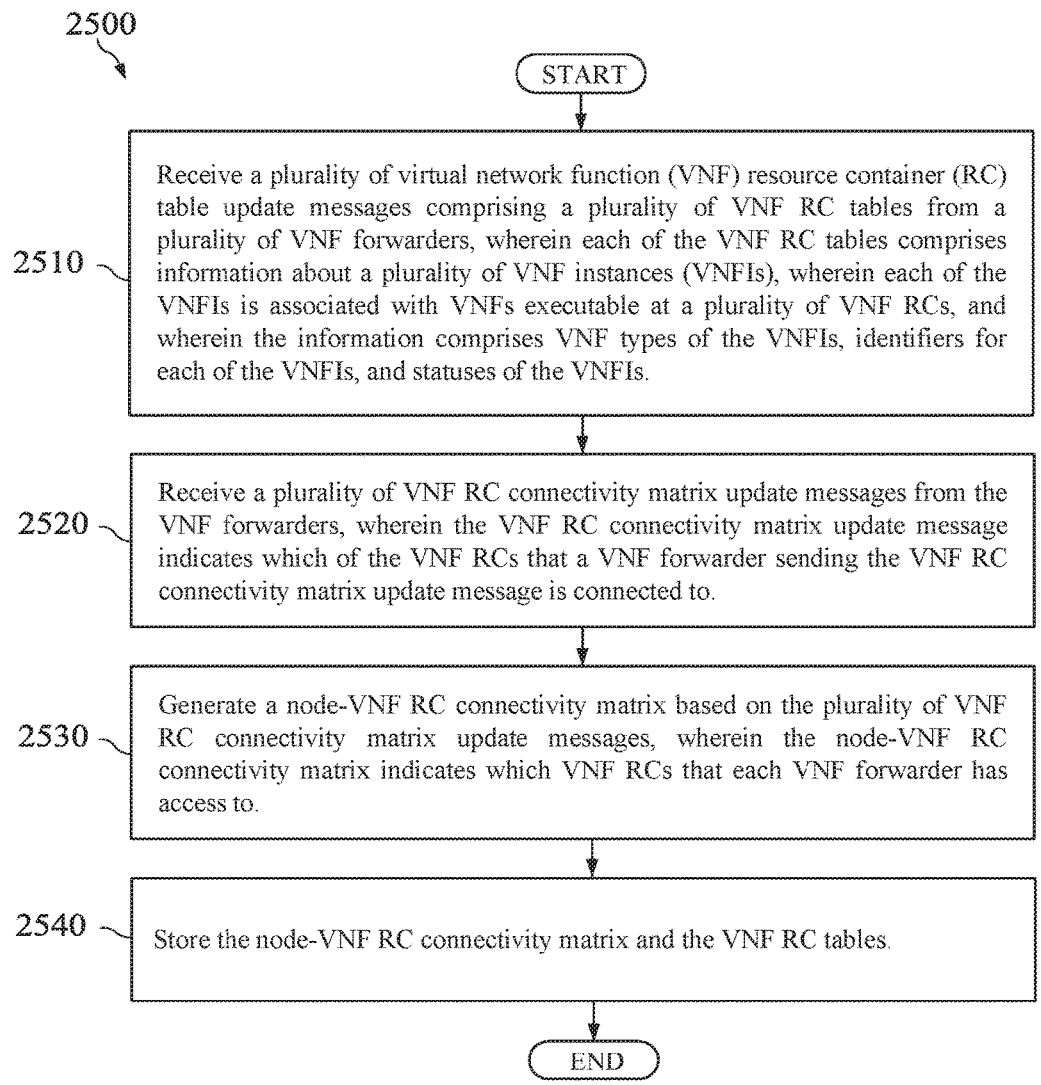
FIG. 25 is a flowchart diagram of a VNF-enabled packet forwarding method according to an embodiment of the disclosure.

FIG. 25 is a flowchart of an embodiment of a VNF-enabled packet forwarding method 2500 according to an embodiment of the disclosure. The method 2500 is implemented by a GRO, such as GRO 270, when the GRO receives a VNF RC connectivity matrix update message and/or a VNF resource container table from one or more VNF forwarders, such as the VNF forwarders 231, 233, and 235. At step 2510, a plurality of VNF resource container table update messages comprising a plurality of VNF RC tables are received from a plurality of VNF forwarders. For example, the Rx 320 receives the VNF resource container table update messages from the VNF forwarders. In an embodiment, each of the VNF resource container tables comprises information about a plurality of VNFIs. In an embodiment, each of the VNFIs is associated with VNFs executable at a plurality of VNF resource containers. In an embodiment, the information comprises VNF types of the VNFIs, identifiers for each of the VNFIs, and statuses of the VNFIs. At step 2520, a plurality of VNF resource container connectivity matrix update messages are received from the VNF forwarders. For example, Rx 320 receives the VNF resource container connectivity matrix update messages from the VNF forwarders. In an embodiment, the VNF resource container connectivity matrix update message indicates which of the VNF resource containers that a VNF forwarder sending the VNF resource container connectivity matrix update message is connected to. At step 2530, a node-VNF resource container connectivity matrix is generated based on the plurality of VNF resource container connectivity matrix update messages. For example, the processor 330 generates the node-VNF resource container connectivity matrix based on the plurality of VNF resource container connectivity matrix update messages. In an embodiment, the node-VNF resource container connectivity matrix indicates which VNF resource containers that each VNF forwarder has access to. At step 2540, the node-VNF resource container connectivity matrix and the VNF resource container tables are stored. For example, the node-VNF resource container connectivity matrix and the VNF resource container tables are stored in the memory 360.

In an embodiment, the disclosure includes a method implemented by a GRO, comprising a means for receiving, by a receiver, a plurality of VNF RC table update messages comprising a plurality of VNF RC tables from a plurality of VNF forwarders, wherein each of the VNF RC tables comprises information about a plurality of VNFIs, wherein each of the VNFIs is associated with VNFs executable at a plurality of VNF RCs, and wherein the information comprises VNF types of the VNFIs, identifiers for each of the VNFIs, and statuses of the VNFIs, a means for receiving, by the receiver, a plurality of VNF RC connectivity matrix update messages from the VNF forwarders, wherein the VNF RC connectivity matrix update message indicates which of the VNF RCs that a VNF forwarder sending the VNF RC connectivity matrix update message is connected to, a means for generating, by a processor coupled to the receiver, a node-VNF RC connectivity matrix based on the plurality of VNF RC connectivity matrix update messages, wherein the node-VNF RC connectivity matrix indicates which VNF RCs that each VNF forwarder has access to, and a means for storing, by a memory coupled to the processor, the node-VNF RC connectivity matrix and the VNF RC tables.

In another embodiment, the disclosure includes an NE implemented as a GRO, comprising a means for receiving a plurality of VNF RC table update messages comprising a plurality of VNF RC tables from a plurality of VNF forwarders, wherein each of the VNF RC tables comprises information about a plurality of VNFIs, wherein each of the VNFIs are associated with VNFs executable at a plurality of VNF RCs, and wherein the information comprises VNF types of the VNFIs, identifiers for each of the VNFIs, and statuses of the VNFIs, a means for receiving a plurality of VNF RC connectivity matrix update messages from the VNF forwarders, wherein the VNF RC connectivity matrix update message indicates which of the VNF RC that a VNF forwarder sending the VNF RC connectivity matrix update message is connected to, a means for generating a node-VNF RC connectivity matrix based on the plurality of VNF RC connectivity matrix update messages, wherein the node-VNF RC connectivity matrix indicates which VNF RCs that each VNF forwarder has access to, and a means for storing the node-VNF RC connectivity matrix and the VNF resource container tables.

In another embodiment, the disclosure further includes an NE implemented as an SDN controller, comprising a means for receiving a VNF chain request from a client application, wherein the VNF chain request comprises an ordered set of VNFs, a means for obtaining network resource conditions of a network associated with the SDN, a means for generating a query message, wherein the query message comprises the VNF chain request and the network resource conditions, and a means for transmitting the query message to a GRO.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed:

1. A method implemented by a global resource orchestrator (GRO) in a network, comprising:
   receiving, by a receiver of the GRO, a virtual network function (VNF) resource container (RC) table update message comprising a VNF RC table from a VNF forwarder, the VNF RC table including information describing a plurality of VNF instances (VNFIs) hosted by a VNF RC coupled to the VNF forwarder, an identifier of the VNF RC hosting the VNFIs, and an identifier of the VNF forwarder, each of the VNFIs being an instance of a VNF executable at one of a plurality of VNF RCs;
   receiving, by the receiver of the GRO, a VNF RC connectivity matrix update message from the VNF forwarder, wherein the VNF RC connectivity matrix update message identifies the VNF RC as being coupled to the VNF forwarder;
   generating, by a processor coupled to the receiver of the GRO, a node-VNF RC connectivity matrix indicating a connectivity between a plurality of VNF RCs and a plurality of VNF forwarders in the network based on the VNF RC connectivity matrix update message; and storing, by a memory coupled to the processor of the GRO, the node-VNF RC connectivity matrix and the VNF RC table.

2. The method of claim 1, wherein the information comprises VNF types of the VNFIs, identifiers for each of the VNFIs, and statuses of the VNFIs.

3. The method of claim 1, wherein the information comprises statuses of the VNFIs, and wherein the statuses of the VNFIs indicate an available status when the VNFIs are idle.

4. The method of claim 1, wherein the information comprises statuses of the VNFIs, and wherein the statuses of the VNFIs indicate an unavailable status when the VNFIs are already providing a service.

5. The method of claim 1, wherein the information comprises statuses of the VNFIs, and wherein the statuses of the VNFIs indicate an unavailable state when the VNFIs have failed.

6. The method of claim 1, wherein the information comprises statuses of the VNFIs, wherein the statuses of the VNFIs indicate an available status when the VNFIs are idle, and wherein the method further comprises:
  receiving, by the receiver of the GRO, a query message from a software defined network (SDN) controller, wherein the SDN controller is configured to communicate with the VNF forwarders and the VNF RCs, wherein the query message comprises a VNF chain request and network resource conditions, wherein the VNF chain request comprises an ordered set of VNFs, and wherein the network resource conditions comprise network element connectivity data;
  calculating, by the processor of the GRO, an optimal sequence of VNFIs using the node-VNF RC connectivity matrix and the VNF RC table;
  transmitting, by a transmitter coupled to the processor of the GRO, information about the optimal sequence of VNFIs to a plurality of VNF forwarders that are associated with the VNFIs in the optimal sequence of VNFIs; and
  storing, in the memory of the GRO, the optimal sequence of VNFIs.

7. The method of claim 6, further comprising:
  calculating, by the processor of the GRO, a VNF chain path based on the optimal sequence of VNFIs, the node-VNF RC connectivity matrix, the VNF RC table, and the network resource conditions, wherein the network resource conditions are provided by the SDN controller;
  transmitting, by the transmitter of the GRO, the VNF chain path to the SDN controller; and
  storing, in the memory of the GRO, the VNF chain path.

8. The method of claim 6, further comprising:
  receiving, by the receiver of the GRO, an updated RC table update message from the VNF forwarder, wherein the updated RC table update message comprises an indication that one of the VNFIs that has an available status has become unavailable;
  updating, by the processor of the GRO, the VNF RC table stored in the memory with a status change based on the updated RC table update message;
  updating, by the processor of the GRO, the optimal sequence of VNFIs to use another VNFI that is in the available status, the one of VNFIs that became unavailable being a VNFI of the optimal sequence of VNFIs in the memory;
  re-calculating, by the processor of the GRO, a new VNF chain path based on the optimal sequence of VNFIs responsive to updating the optimal sequence of VNFIs, the node-VNF RC connectivity matrix, the VNF RC table, and the network resource conditions;
  transmitting, by the transmitter of the GRO, the new VNF chain path to the SDN controller; and
  storing, in the memory of the GRO, the new VNF chain path.

9. The method of claim 1, wherein the VNF forwarders comprise virtual machines (VMs).

10. The method of claim 1, wherein the plurality of VNF RCs are coupled to at least one VNF forwarder.

11. A network element (NE) implemented as a global resource orchestrator (GRO) in a network, comprising:
  a receiver configured to:
    receive a virtual network function (VNF) resource container (RC) table update message comprising a VNF RC table from a VNF forwarder, the VNF RC table including information describing a plurality of VNF instances (VNFIs) hosted by a VNF RC coupled to the VNF forwarder, an identifier of the VNF RC hosting the VNFIs, and an identifier of the VNF forwarder, each of the VNFIs being an instance of a VNF executable at one of a plurality of VNF RCs; and
    receive a VNF RC connectivity matrix update message from the VNF forwarder, wherein a VNF RC connectivity matrix update message identifies the VNF RC as being coupled to the VNF forwarder;
  a processor coupled to the receiver and configured to generate a node-VNF RC connectivity matrix indicating a connectivity between a plurality of VNF RCs and a plurality of VNF forwarders in the network based on the VNF RC connectivity matrix update message; and
  a memory coupled to the processor and configured to store the node-VNF RC connectivity matrix and the VNF resource container table.

12. The NE of claim 11, wherein the information comprises VNF types of the VNFIs, identifiers for each of the VNFIs, and statuses of the VNFIs.

13. The NE of claim 12, wherein the receiver is further configured to receive a query message from a software defined network (SDN) controller, wherein the SDN controller is configured to communicate with the VNF forwarders and the VNF RCs, wherein the query message comprises a VNF chain request and network resource conditions, wherein the VNF chain request comprises an ordered set of VNFs, wherein the network resource conditions comprise network element connectivity data, wherein the processor is further configured to calculate an optimal sequence of VNFIs using the node-VNF RC connectivity matrix and the VNF RC table, wherein the NE further comprises a transmitter coupled to the processor and configured to transmit information about the optimal sequence of VNFIs to a plurality of VNF forwarders that are associated with the VNFIs in the optimal sequence of VNFIs, and wherein the memory is further configured to store the optimal sequence of VNFIs.

14. The NE of claim 13, wherein the processor is further configured to calculate a VNF chain path based on the optimal sequence of VNFIs, the node-VNF RC connectivity matrix, the VNF RC table, and the network resource conditions, wherein the network resource conditions are provided by the SDN controller, wherein the transmitter is further configured to transmit the VNF chain path to the SDN controller, and wherein the memory is further configured to store the VNF chain path.

15. The NE of claim 13, wherein receiver is further configured to receive an updated RC table update message from the VNF forwarder, wherein the updated RC table update message comprises an indication that one of the VNFIs that is in an available status has become unavailable, wherein the processor is further configured to:
update the VNF RC table stored in the memory with a status change based on the updated RC table update message;
update the optimal sequence of VNFIs to use another VNFI that is in the available status, the one of VNFIs that became unavailable being indicated as a VNFI of the optimal sequence of VNFIs in the memory; and
re-calculate a new VNF chain path based on the updated optimal sequence of VNFIs, the node-VNF RC connectivity matrix, the VNF RC table, and the network resource conditions,
wherein the transmitter is further configured to transmit the new VNF chain path to the SDN controller, and
wherein the processor is further configured to store the new VNF chain path.

16. A global resource orchestrator (GRO) implemented in a network, comprising:
a receiver configured to:
receive of virtual network function (VNF) resource container (RC) table update message comprising a VNF RC table from a VNF forwarder, the VNF RC table including information describing a plurality of VNF instances (VNFIs) hosted by a VNF RC coupled to the VNF forwarder, an identifier of the VNF RC hosting the VNFIs, and an identifier of the VNF forwarder, each of the VNFIs being an instance of a VNF executable at one of a plurality of VNF RCs; and
receive a VNF RC connectivity matrix update message from the VNF forwarder, wherein the VNF RC connectivity matrix update message identifies the VNF RC as being coupled to the VNF forwarder;
a memory configured to store instructions;
a processor coupled to the receiver and configured to execute the instructions to generate a node-VNF RC connectivity matrix indicating a connectivity between a plurality of VNF RCs and a plurality of VNF forwarders in the network based on the VNF RC connectivity matrix update message; and
a memory coupled to the processor and configured to store the node-VNF RC connectivity matrix and the VNF resource container table.

17. The GRO of claim 16, wherein the information comprises VNF types of the VNFIs, identifiers for each of the VNFIs, and statuses of the VNFIs.

18. The GRO of claim 16, wherein the receiver is further configured to receive a query message from a client, wherein the query message comprises a VNF chain request and network resource conditions, wherein the VNF chain request comprises an ordered set of VNFs, wherein the network resource conditions comprise network element connectivity data, wherein the processor is further configured to calculate an optimal sequence of VNFIs using the node-VNF RC connectivity matrix and the VNF RC table, wherein the GRO further comprises a transmitter coupled to the processor and configured to transmit information about the optimal sequence of VNFIs to a plurality of VNF forwarders that are associated with the VNFIs in the optimal sequence of VNFIs, and wherein the memory is further configured to store the optimal sequence of VNFIs.

19. The GRO of claim 16, wherein the information comprises statuses of the VNFIs, and wherein the statuses of the VNFIs indicate an available status when the VNFIs are idle.

20. The GRO of claim 16, wherein the information comprises statuses of the VNFIs, and wherein the statuses of the VNFIs indicate an unavailable status when the VNFIs are already providing a service.

* * * * *